US011782554B2

(12) United States Patent
Chen et al.

(10) Patent No.: US 11,782,554 B2
(45) Date of Patent: Oct. 10, 2023

(54) ANTI-MISTOUCH METHOD OF CURVED SCREEN AND ELECTRONIC DEVICE

(71) Applicant: Huawei Technologies Co., Ltd., Shenzhen (CN)

(72) Inventors: Lanhao Chen, Shenzhen (CN); Shikun Xu, Shenzhen (CN); Jianwei Cui, Beijing (CN); Fei Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/562,397

(22) Filed: Dec. 27, 2021

(65) Prior Publication Data

US 2022/0121316 A1     Apr. 21, 2022

Related U.S. Application Data

(63) Continuation of application No. PCT/CN2020/098446, filed on Jun. 28, 2020.

(30) Foreign Application Priority Data

Jun. 28, 2019  (CN) .......................... 201910578705.4

(51) Int. Cl.
*G06F 3/041* (2006.01)
*G06T 7/70* (2017.01)
*H04M 1/72454* (2021.01)

(52) U.S. Cl.
CPC .............. *G06F 3/0418* (2013.01); *G06T 7/70* (2017.01); *G06T 2207/30201* (2013.01); *H04M 1/72454* (2021.01); *H04M 2250/12* (2013.01); *H04M 2250/22* (2013.01)

(58) Field of Classification Search
CPC .................. G06F 3/0418; G06T 7/70; G06T 2207/30201; H04M 1/72454; H04M 2250/12; H04M 2250/22
See application file for complete search history.

(56) References Cited

U.S. PATENT DOCUMENTS

| | | | | |
|---|---|---|---|---|
| 9,411,451 | B2* | 8/2016 | Myers | G06F 3/0446 |
| 9,791,949 | B2* | 10/2017 | Myers | G06F 3/041 |
| 10,318,029 | B2* | 6/2019 | Myers | G06F 3/0488 |
| 10,521,034 | B2* | 12/2019 | Myers | G06F 1/1652 |

(Continued)

FOREIGN PATENT DOCUMENTS

| | | |
|---|---|---|
| AU | 2019100486 A4 | 6/2019 |
| CN | 103116403 A | 5/2013 |

(Continued)

*Primary Examiner* — Michael Pervan
(74) *Attorney, Agent, or Firm* — Slater Matsil, LLP

(57) ABSTRACT

An electronic device obtains an included angle between a touchscreen (a curved screen with a radian on a side edge) and a horizontal plane; starts a camera in response to the included angle between the touchscreen and the horizontal plane falling within a first preset angle range; obtains a distance between the electronic device and a user and a face yaw degree of the user in response to the camera collecting a face image; and performs anti-mistouch processing on a preset mistouch operation of the user on the touchscreen in response to the distance between the electronic device and the user being less than a first distance threshold and the face yaw degree falling within a second preset angle range.

20 Claims, 12 Drawing Sheets

(56) References Cited

U.S. PATENT DOCUMENTS

| | | | |
|---|---|---|---|
| 10,936,136 B2* | 3/2021 | Myers | G06F 3/04817 |
| 11,237,685 B2* | 2/2022 | Myers | G06F 3/041 |
| 2014/0267177 A1 | 9/2014 | Bathiche et al. | |
| 2015/0130767 A1* | 5/2015 | Myers | G06F 3/0488 |
| | | | 345/174 |
| 2015/0227227 A1* | 8/2015 | Myers | G06F 1/1652 |
| | | | 345/173 |
| 2018/0356913 A1* | 12/2018 | Myers | G06F 1/1652 |
| 2019/0278394 A1* | 9/2019 | Myers | G06F 3/04817 |
| 2020/0125193 A1* | 4/2020 | Myers | G06F 3/0446 |
| 2021/0157453 A1* | 5/2021 | Myers | G06F 3/0446 |

FOREIGN PATENT DOCUMENTS

| | | |
|---|---|---|
| CN | 103970277 A | 8/2014 |
| CN | 104007932 A | 8/2014 |
| CN | 104182154 A | 12/2014 |
| CN | 104238948 A | 12/2014 |
| CN | 104541231 A | 4/2015 |
| CN | 105243345 A | 1/2016 |
| CN | 105700709 A | 6/2016 |
| CN | 105892920 A | 8/2016 |
| CN | 106020698 A | 10/2016 |
| CN | 106572299 A | 4/2017 |
| CN | 106681638 A | 5/2017 |
| CN | 106708263 A | 5/2017 |
| CN | 106775404 A | 5/2017 |
| CN | 107317918 A | 11/2017 |
| CN | 107450778 A | 12/2017 |
| CN | 107613119 A | 1/2018 |
| CN | 108200340 A | 6/2018 |
| CN | 109635539 A | 4/2019 |
| CN | 109710080 A | 5/2019 |
| CN | 109782944 A | 5/2019 |
| CN | 110456938 A | 11/2019 |
| JP | 2014102557 A | 6/2014 |
| WO | 2014169567 A1 | 10/2014 |

* cited by examiner xOy plane: local horizontal plane
yOz plane: local meridian plane

ANTI-MISTOUCH METHOD OF CURVED SCREEN AND ELECTRONIC DEVICE

CROSS-REFERENCE TO RELATED APPLICATIONS

This application is a continuation of International Application No. PCT/CN2020/098446, filed on Jun. 28, 2020, which claims priority to Chinese Patent Application No. 201910578705.4, filed on Jun. 28, 2019. The disclosures of the aforementioned applications are hereby incorporated by reference in their entireties.

TECHNICAL FIELD

Embodiments of this application relate to the field of terminal technologies, and in particular, to an anti-mistouch method of a curved screen and an electronic device.

BACKGROUND

With the popularization and expansion of intelligent terminals, existing terminals are no longer satisfied with flat touchscreens. Some terminals in the market, such as curved screen mobile phones, have employed curved screens. A side edge of a curved screen mobile phone is a touchscreen with a radian. Therefore, when a user holds the curved screen mobile phone, fingers are prone to touch the side edge of the curved screen, which leads to a mistouch on the curved screen.

In a process of using a curved screen mobile phone, how to prevent a user from mistouching a side edge of a curved screen is an urgent problem to be resolved.

SUMMARY

Embodiments of this application provide an anti-mistouch method of a curved screen and an electronic device, to implement anti-mistouch on a side edge of the curved screen, improve accuracy of anti-mistouch, and further improve user experience in using a curved screen device.

To achieve the foregoing objective, the embodiments of this application use the following technical solutions:

According to a first aspect, an embodiment of this application provides an anti-mistouch method of a curved screen. The method may be applied to an electronic device, and a touchscreen of the electronic device is a curved screen with a radian on a side edge. The method includes: The electronic device obtains an included angle between the touchscreen and a horizontal plane; the electronic device starts a camera in response to the included angle between the touchscreen and the horizontal plane falling within a first preset angle range; the electronic device obtains a distance between the electronic device and a user and a face yaw degree of the user in response to the camera collecting a face image; and the electronic device performs anti-mistouch processing on a preset mistouch operation of the user on the touchscreen in response to the distance between the electronic device and the user being less than a first distance threshold and the face yaw degree falling within a second preset angle range.

The face yaw degree is a left-right rotation angle of a face orientation of the user relative to a first connecting line, and the first connecting line is a connecting line between the camera and a head of the user. When the user performs the preset mistouch operation, a contact surface between a hand of the user and the touchscreen is: a first contact surface in a first-side radian region of the touchscreen and x second contact surfaces in a second-side radian region of the touchscreen, where $1 \leq x \leq 4$, and x is a positive integer.

In this embodiment of this application, if the included angle between the touchscreen and the horizontal plane falls within the first preset angle range, the camera may collect a face image, and if the distance between the electronic device and the user is less than the first distance threshold, and the face yaw degree of the user falls within the second preset angle range, it is more likely that the user uses the electronic device in scenario (1) and scenario (2). Scenario (1) is a scenario in which a user lies flat and holds a mobile phone with one hand. Scenario (2) is a scenario in which a user lies on one side and holds a mobile phone with one hand. In this embodiment of this application, when the electronic device meets the foregoing conditions, it is said that the electronic device is in a preset anti-mistouch scenario.

In scenario (1) and scenario (2), the user holds the electronic device in a relatively fixed manner, the user holds the electronic device by using a relatively large force, and an area of a contact surface between a finger of the user and a left-side radian region and a right-side radian region of the curved screen is relatively large. When the user holds the electronic device, it is more likely that the side edge of the curved screen is mistouched. By using a conventional anti-mistouch solution, the electronic device cannot perform anti-mistouch processing on a touch operation corresponding to the foregoing contact surface.

The preset mistouch operation is a mistouch on the left-side radian region (for example, the second-side radian region) and the right-side radian region (for example, the first-side radian region) of the touchscreen caused by the user holding the electronic device. In this embodiment of this application, in the preset anti-mistouch scenario, the electronic device can identify the preset mistouch operation, and perform anti-mistouch processing on the preset mistouch operation, to improve accuracy of anti-mistouch.

In addition, if the electronic device can identify the preset mistouch operation as a mistouch operation, the electronic device can respond to another non-mistouch operation of the user on the curved screen when the first contact surface and the second contact surface exist, and a problem of a tap failure of the user does not occur, so that user experience in using a curved screen device can be improved.

With reference to the first aspect, in a possible design manner, the first contact surface is a contact surface that is between the touchscreen and a purlicue of a hand of the user and that is collected by the electronic device when the electronic device is held by the user. The second contact surface is a contact surface that is between the touchscreen and a finger of the user and that is collected by the electronic device when the electronic device is held by the user. In other words, the electronic device may determine whether the touch operation is the preset mistouch operation based on whether a position of a touch operation input by the user on the touchscreen is in the first-side radian region or the second-side radian region, and a shape of a contact surface of the touch operation on the touchscreen.

With reference to the first aspect, in another possible design manner, duration of the preset mistouch operation generated when the user holds the electronic device is generally relatively long, but duration of a normal operation of the user on the touchscreen is generally relatively short. To improve accuracy of identifying the preset mistouch operation by the electronic device, when identifying the preset mistouch operation, the electronic device not only may use the shape of the contact surface corresponding to the touch operation as reference, but also may determine whether duration of the touch operation is greater than a preset time. Specifically, the preset mistouch operation may include a touch operation whose duration of contact with the first-side radian region is greater than a first preset time, whose moving distance in the first-side radian region is less than a second distance threshold, and that is collected by the electronic device when the electronic device is held by the user.

With reference to the first aspect, in another possible design manner, that the electronic device performs anti-mistouch processing on a preset mistouch operation of the user on the touchscreen includes: The electronic device receives a first touch operation of the user on the touchscreen; the electronic device identifies that the first touch operation of the user on the touchscreen is the preset mistouch operation by using a preset anti-mistouch algorithm; and the electronic device skips responding to the first touch operation.

With reference to the first aspect, in another possible design manner, when the electronic device determines that the touch operation is the preset mistouch operation, a misjudgment on the touch operation may be made, and accuracy of anti-mistouch is affected. To improve the accuracy of anti-mistouch, the electronic device may continuously determine whether a movement of a relatively large distance occurs in the identified preset mistouch operation. Specifically, after the electronic device identifies that the first touch operation of the user on the touchscreen is the preset mistouch operation by using the preset anti-mistouch algorithm, and before the electronic device skips responding to the first touch operation, the method in this embodiment of this application further includes: The electronic device determines that a moving distance of the first touch operation within a second preset time is less than or equal to a third distance threshold, where the second preset time is a time period whose duration is first preset duration and that starts when the electronic device identifies that the first touch operation is the preset mistouch operation. In other words, if the electronic device identifies that the moving distance of the first touch operation within the second preset time is less than or equal to the third distance threshold, the electronic device does not make a misjudgment on the first touch operation, and may perform anti-mistouch processing on the first touch operation, namely, skip responding to the first touch operation.

With reference to the first aspect, in another possible design manner, the preset mistouch operation (namely, the first touch operation) identified by the electronic device may include one or more touch operations. For example, the first touch operation may include a touch operation corresponding to the first contact surface and touch operations corresponding to the x second contact surfaces. To prevent the electronic device from mistakenly determining that some of the one or more touch operations are preset mistouch operations, the method in this embodiment of this application further includes: The electronic device determines that a moving distance of at least one touch operation in the first touch operation within the second preset time is greater than the third distance threshold; and the electronic device performs an event corresponding to the at least one touch operation in response to the at least one touch operation. The electronic device skips responding to another touch operation in the first touch operation other than the at least one touch operation.

It can be understood that, if the electronic device determines that the moving distance of the at least one touch operation in the first touch operation within the second preset time is greater than the third distance threshold, it indicates that the electronic device makes a misjudgment on the at least one touch operation. In this case, the electronic device may perform false killing prevention processing on the at least one touch operation, in other words, the electronic device may perform a corresponding event in response to the at least one touch operation. If the electronic device does not make a misjudgment on another touch operation in the first touch operation other than the at least one touch operation, the electronic device skips responding to the another touch operation.

With reference to the first aspect, in another possible design manner, the method in this embodiment of this application further includes: If the electronic device receives a second touch operation of the user in the second-side radian region after a third preset time, the electronic device performs an event corresponding to the second touch operation in response to the second touch operation. The third preset time is a time period whose duration is second preset duration and that starts when the electronic device identifies that the first touch operation is the preset mistouch operation.

With reference to the first aspect, in another possible design manner, the first preset angle range includes at least one of $[-n°, n°]$ and $[90°-m°, 90°+m°]$. A value range of n includes at least any one of (0, 20), (0, 15), or (0, 10); and a value range of m includes at least any one of (0, 20), (0, 15), or (0, 10). The second preset angle range is $[-k°, k°]$. A value range of k includes at least any one of (0, 15), (0, 10), or (0, 5).

With reference to the first aspect, in another possible design manner, that the electronic device obtains an included angle between the touchscreen and a horizontal plane includes: The electronic device obtains the included angle between the touchscreen and the horizontal plane by using one or more sensors. The one or more sensors may include at least a gyro sensor.

With reference to the first aspect, in another possible design manner, the electronic device further includes a structured light camera module, the structured light camera module includes a light projector, a first camera, and a second camera, and a distance between the first camera and the second camera is a first length. That the electronic device obtains a distance between the electronic device and a user in response to the camera collecting a face image includes: In response to the camera collecting a face image, the electronic device transmits optical information by using the light projector, collects first image information of a face of the user corresponding to the face image by using the first camera, and collects second image information of the face by using the second camera, where the first image information and the second image information include features of the face; the electronic device calculates depth information of the face based on the first image information, the second image information, the first length, a lens focal length of the first camera, and a lens focal length of the second camera; and the electronic device calculates the distance between the electronic device and the user and the face yaw degree of the user based on the depth information of the face.

With reference to the first aspect, in another possible design manner, the electronic device further includes a distance sensor. That the electronic device obtains a distance between the electronic device and a user in response to the camera collecting a face image includes: The electronic device obtains the distance between the electronic device and the user by using the distance sensor in response to the camera collecting a face image.

According to a second aspect, an embodiment of this application provides an electronic device. The electronic device includes a processor, a memory, a touchscreen, and a camera, where the touchscreen is a curved screen with a radian on a side edge. The processor is configured to obtain an included angle between the touchscreen and a horizontal plane; and start, by the electronic device, a camera in response to the included angle between the touchscreen and the horizontal plane falling within a first preset angle range. The camera is configured to collect an image. The processor is further configured to: obtain a distance between the electronic device and a user and a face yaw degree of the user in response to the camera collecting a face image, where the face yaw degree is a left-right rotation angle of a face orientation of the user relative to a first connecting line, and the first connecting line is a connecting line between the camera and a head of the user; and perform anti-mistouch processing on a preset mistouch operation of the user on the touchscreen in response to the distance between the electronic device and the user being less than a first distance threshold and the face yaw degree falling within a second preset angle range. When the user performs the preset mistouch operation, a contact surface between a hand of the user and the touchscreen is: a first contact surface in a first-side radian region of the touchscreen and x second contact surfaces in a second-side radian region of the touchscreen, where 1≤x≤4, and x is a positive integer.

With reference to the second aspect, in another possible design manner, the first contact surface is a contact surface that is between the touchscreen and a purlicue of a hand of the user and that is collected by the electronic device when the electronic device is held by the user; and the second contact surface is a contact surface that is between the touchscreen and a finger of the user and that is collected by the electronic device when the electronic device is held by the user.

With reference to the second aspect, in another possible design manner, the preset mistouch operation includes a touch operation whose duration of contact with the first-side radian region is greater than a first preset time, whose moving distance in the first-side radian region is less than a second distance threshold, and that is collected by the electronic device when the electronic device is held by the user.

With reference to the second aspect, in another possible design manner, that the processor is configured to perform anti-mistouch processing on a preset mistouch operation of the user on the touchscreen includes: the processor is specifically configured to receive a first touch operation of the user on the touchscreen; identify that the first touch operation is the preset mistouch operation by using a preset anti-mistouch algorithm; and skip responding to the first touch operation.

With reference to the second aspect, in another possible design manner, the processor is further configured to: after identifying that the first touch operation is the preset mistouch operation by using the preset anti-mistouch algorithm, and before skipping responding to the first touch operation, determine that a moving distance of the first touch operation within a second preset time is less than or equal to a third distance threshold. The second preset time is a time period whose duration is first preset duration and that starts when the electronic device identifies that the first touch operation is the preset mistouch operation.

With reference to the second aspect, in another possible design manner, the first touch operation includes one or more touch operations. The processor is further configured to: determine that a moving distance of at least one touch operation in the first touch operation within the second preset time is greater than the third distance threshold, perform, by the electronic device, an event corresponding to the at least one touch operation in response to the at least one touch operation; and skip responding to another touch operation in the first touch operation other than the at least one touch operation.

With reference to the second aspect, in another possible design manner, the processor is further configured to: if a second touch operation of the user in the second-side radian region is received after a third preset time, perform an event corresponding to the second touch operation in response to the second touch operation. The third preset time is a time period whose duration is second preset duration and that starts when the electronic device identifies that the first touch operation is the preset mistouch operation.

With reference to the second aspect, in another possible design manner, the first preset angle range includes at least one of [−n°, n°] and [90°−m°, 90°+m°]; a value range of n includes at least any one of (0, 20), (0, 15), or (0, 10); and a value range of m includes at least any one of (0, 20), (0, 15), or (0, 10). The second preset angle range is [−k°, k°], where a value range of k includes at least any one of (0, 15), (0, 10), or (0, 5).

With reference to the second aspect, in another possible design manner, the electronic device further includes one or more sensors, and the one or more sensors include at least a gyro sensor. That the processor is configured to obtain an included angle between the touchscreen and a horizontal plane includes: the processor is specifically configured to obtain the included angle between the touchscreen and the horizontal plane by using the one or more sensors.

With reference to the second aspect, in another possible design manner, the electronic device further includes a structured light camera module, the structured light camera module includes a light projector, a first camera, and a second camera, and a distance between the first camera and the second camera is a first length. That the processor is configured to obtain a distance between the electronic device and a user in response to the camera collecting a face image includes: the processor is specifically configured to: in response to the camera collecting a face image, transmit optical information by using the light projector, collect first image information of a face of the user corresponding to the face image by using the first camera, and collect second image information of the face by using the second camera, where the first image information and the second image information include features of the face; calculate depth information of the face based on the first image information, the second image information, the first length, a lens focal length of the first camera, and a lens focal length of the second camera; and calculate the distance between the electronic device and the user and the face yaw degree of the user based on the depth information of the face.

With reference to the second aspect, in another possible design manner, the electronic device further includes a distance sensor. That the processor is configured to obtain a distance between the electronic device and a user in response to the camera collecting a face image includes: the processor is specifically configured to obtain the distance between the electronic device and the user by using the distance sensor in response to the camera collecting a face image.

According to a third aspect, this application provides a chip system. The chip system is applied to an electronic device including a touchscreen. The chip system includes one or more interface circuits and one or more processors. The interface circuit and the processor are interconnected by using a line. The interface circuit is configured to receive a signal from a memory of the electronic device, and send the signal to the processor, where the signal includes a computer instruction stored in the memory. When the processor executes the computer instruction, the electronic device performs the method according to any one of the first aspect or the possible design manners of the first aspect.

According to a fourth aspect, an embodiment of this application provides a computer storage medium. The computer storage medium includes a computer instruction. When the computer instruction is run on an electronic device, the electronic device is enabled to perform the anti-mistouch method of a curved screen according to any one of the first aspect or the possible design manners of the first aspect.

According to a fifth aspect, an embodiment of this application provides a computer program product. When the computer program product is run on a computer, the computer is enabled to perform the anti-mistouch method of a curved screen according to any one of the first aspect or the possible design manners of the first aspect.

It can be understood that, the electronic device in the second aspect and the possible design manners of the second aspect, the chip system in the third aspect, the computer storage medium in the fourth aspect, and the computer program product in the fifth aspect provided above are all used to perform the corresponding method provided above. Therefore, for beneficial effects that can be achieved, refer to beneficial effects in the corresponding method provided above. Details are not described herein again.

DETAILED DESCRIPTION OF ILLUSTRATIVE EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment, unless otherwise stated, "a plurality of" means two or more than two.

Figure 1A:
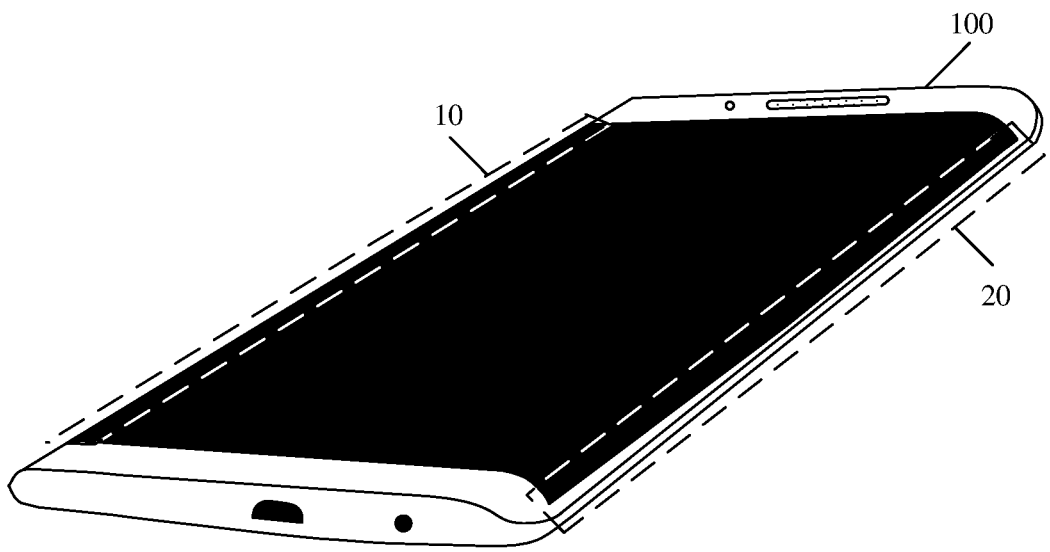
FIG. 1(a) and FIG. 1(b) are a schematic diagram of a product form of a curved screen mobile phone according to an embodiment of this application.
Figure 1B:
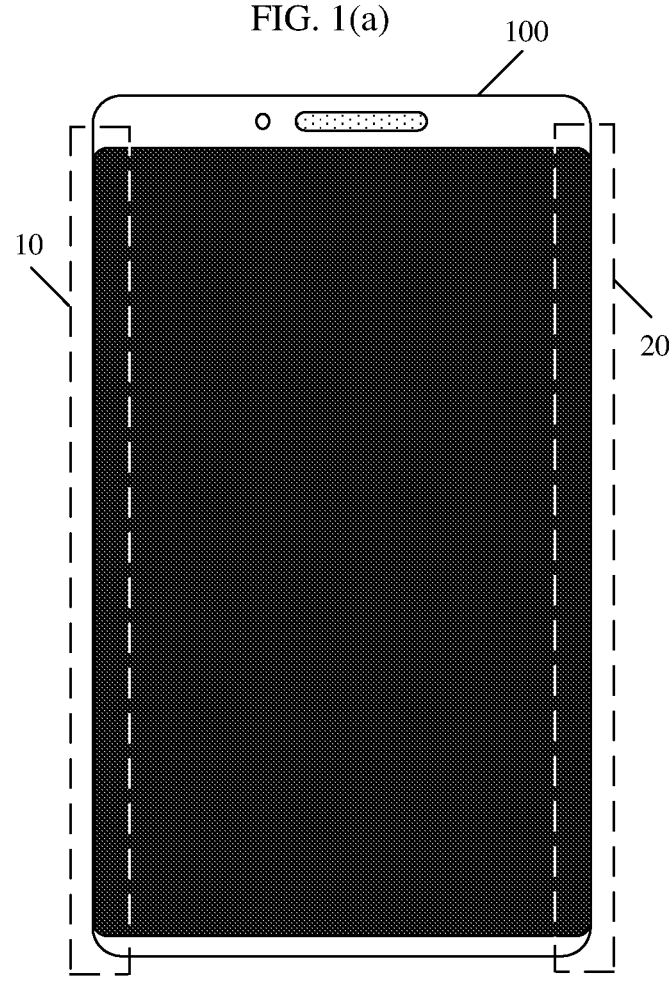

An embodiment of this application provides an anti-mistouch method of a curved screen, which may be applied to an electronic device. A touchscreen of the electronic device is a curved screen with a radian on a side edge. For example, the electronic device is a curved screen mobile phone shown in FIG. 1(a) and FIG. 1(b). FIG. 1(a) shows a 3D diagram of a curved screen mobile phone 100. FIG. 1(b) shows a main view of the curved screen mobile phone 100. As shown in FIG. 1(a) and FIG. 1(b), a touchscreen of the mobile phone 100 is a curved screen with a radian on each of a left side edge 10 and a right side edge 20.

Figure 2A:
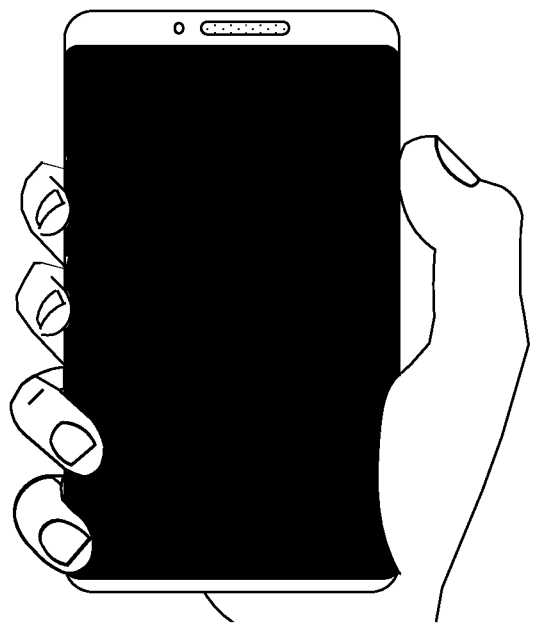
FIG. 2(a) and FIG. 2(b) are a schematic diagram of a curved screen mobile phone being held by a user according to an embodiment of this application.
Figure 2B:
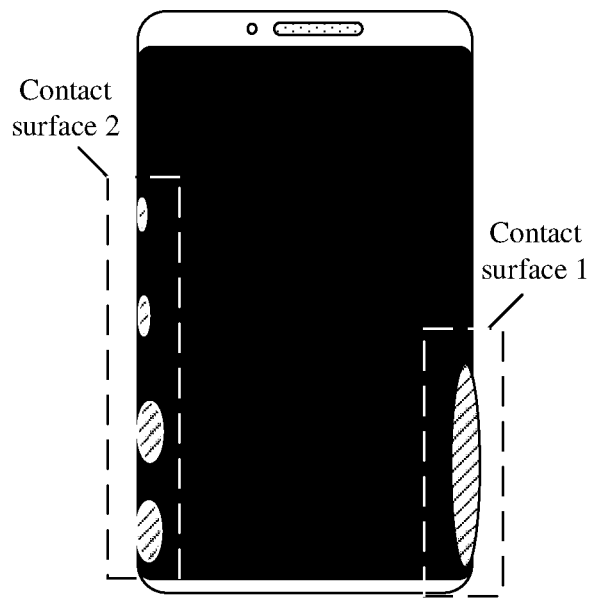

The touchscreen of the curved screen mobile phone is a curved screen with a radian on a side edge. Therefore, when a user holds the curved screen mobile phone, a finger of the user comes into large-area contact with a radian region of the touchscreen. For example, as shown in FIG. 2(a), the user holds the curved screen mobile phone with a right hand. As shown in FIG. 2(b), a contact surface between a purlicue and a thumb of a right hand of the user and a left-side radian region of the curved screen is a contact surface 1, and a contact surface between the other fingers of the right hand of the user and a right-side radian region of the curved screen is a contact surface 2. There may be one to four contact points in the contact surface 2. In FIG. 2(a) and FIG. 2(b), for example, the contact surface 2 includes 4 contact points.

In a conventional anti-mistouch solution, after a mobile phone collects a touch operation of a user on a touchscreen, the mobile phone may perform anti-mistouch processing on a small-area contact point between the user and a side edge of the touchscreen, but performs no anti-mistouch processing on large-area contact points such as the contact surface 1 and the contact surface 2 shown in FIG. 2(a) and FIG. 2(b). As a result, by using the conventional anti-mistouch solution, the mobile phone 100 performs no anti-mistouch processing on touch operations corresponding to the contact surface 1 and the contact surface 2, which increases a possibility of a misoperation of the user. In other words, the conventional anti-mistouch solution is not suitable for an electronic device having the foregoing curved screen.

Particularly, the foregoing problem is especially prominent in the following scenario (1) and scenario (2). Scenario (1) is a scenario in which a user lies flat and holds a mobile phone with one hand. Scenario (2) is a scenario in which a user lies on one side and holds a mobile phone with one hand.

Specifically, in scenario (1) and scenario (2), the user holds the electronic device in a relatively fixed manner, the user holds the electronic device by using a relatively large force, and an area of a contact surface between a finger of the user and the left-side radian region and the right-side radian region of the curved screen is relatively large. Therefore, in the two scenarios, when the user holds the curved screen mobile phone, it is more likely that the side edge of the curved screen is mistouched. By using the conventional anti-mistouch solution, the mobile phone cannot perform anti-mistouch processing on a touch operation corresponding to the foregoing contact surface.

In addition, if the mobile phone 100 performs no anti-mistouch processing on the touch operations corresponding to the contact surface 1 and the contact surface 2, in other words, the mobile phone 100 identifies the touch operations corresponding to the contact surface 1 and the contact surface 2 as normal touch operations (namely, non-mistouch operations), the mobile phone 100 cannot respond to another non-mistouch operation of the user on the curved screen when the contact surface 1 and the contact surface 2 exist, and a problem of a tap failure of the user occurs, affecting user experience.

In the anti-mistouch method of a curved screen provided in this embodiment of this application, the electronic device can identify a scenario in which the electronic device is located. When identifying that the electronic device is in a preset mistouch scenario, the electronic device may start a preset anti-mistouch algorithm. The preset anti-mistouch algorithm may be used to implement anti-mistouch on the side edge of the curved screen. To be specific, by using the preset anti-mistouch algorithm, the electronic device may identify the touch operations corresponding to the contact surface 1 and the contact surface 2 shown in FIG. 2(b) as mistouch operations, thereby improving accuracy of anti-mistouch.

In addition, if the electronic device may identify the touch operations corresponding to the contact surface 1 and the contact surface 2 shown in FIG. 2(b) as mistouch operations, the electronic device can respond to another non-mistouch operation of the user on the curved screen when the contact surface 1 and the contact surface 2 exist. Therefore, the problem of a tap failure of the user does not occur, so that user experience in using a curved screen device can be improved.

For example, when the user uses the electronic device in the foregoing scenario (1) or scenario (2), the electronic device may be in the preset mistouch scenario. For detailed descriptions of the preset mistouch scenario, refer to descriptions in the following embodiments. Details are not described herein in this embodiment of this application.

For example, the electronic device in this embodiment of this application may be a mobile phone, a tablet computer, a desktop computer, a laptop computer, a handheld computer, a notebook computer, an ultra-mobile personal computer (UMPC), a netbook, or a device including the foregoing curved screen, such as a cellular phone, a personal digital assistant (PDA), or an augmented reality (AR)/virtual reality (VR) device. A specific form of the electronic device is not specifically limited in this embodiment of this application.

The following describes the implementations of the embodiments of this application in detail with reference to accompanying drawings.

Figure 3:
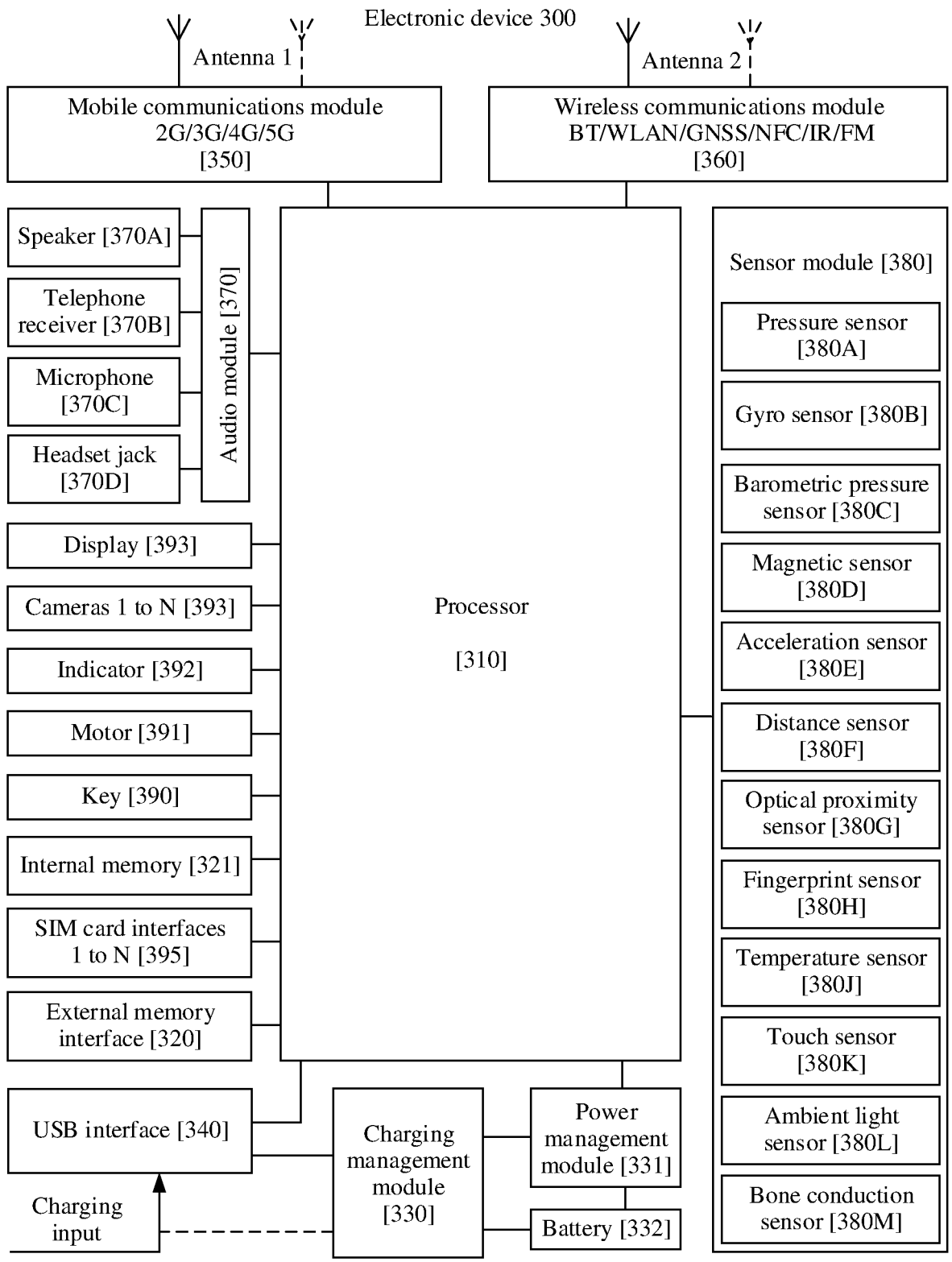
FIG. 3 is a schematic structural diagram of hardware of an electronic device according to an embodiment of this application.

FIG. 3 is a schematic structural diagram of an electronic device 300 according to an embodiment of this application. As shown in FIG. 3, the electronic device 300 may include a processor 310, an external memory interface 320, an internal memory 321, a universal serial bus (USB) interface 330, a charging management module 340, a power management module 341, a battery 342, an antenna 1, an antenna 2, a mobile communications module 350, a wireless communications module 360, an audio module 370, a speaker 370A, a telephone receiver 370B, a microphone 370C, a headset jack 370D, a sensor module 380, a key 390, a motor 391, an indicator 392, a camera 393, a display 394, a subscriber identity module (SIM) card interface 395, and the like. The sensor module 380 may include a pressure sensor 380A, a gyro sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It can be understood that, a structure illustrated in this embodiment constitutes no specific limitation on the electronic device 300. In some other embodiments, the electronic device 300 may include more or fewer components than those shown in the figure, or combine specific components, or split some components, or have different component arrangements. The components shown in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated in one or more processors.

The controller may be a nerve center and a command center of the electronic device 300. The controller may generate an operation control signal based on an instruction operation code and a timing signal, to complete control on instruction fetching and instruction execution.

A memory may be further disposed in the processor 310, and is configured to store instructions and data. In some embodiments, the memory in the processor 310 is a cache memory. The memory may store an instruction or data that has just been used or has been repeatedly used by the processor 310. If the processor 310 needs to reuse the instruction or the data, the processor 310 may directly invoke the instruction or the data from the memory. Repeated access is avoided, and a waiting time of the processor 310 is reduced. Therefore, system efficiency is improved.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like It can be understood that, the interface connection relationship between the modules illustrated in this embodiment is merely an example for description, and does not constitute a structural limitation on the electronic device 300. In some other embodiments, the electronic device 300 may alternatively use different interface connection manners in the foregoing embodiments, or a combination of a plurality of interface connection manners.

The charging management module 340 is configured to receive charging input from a charger. The charger may be a wireless charger, or may be a wired charger. In some embodiments of wired charging, the charging management module 340 may receive charging input from a wired charger through the USB interface 330. In some embodiments of wireless charging, the charging management module 340 may receive wireless charging input through a wireless charging coil of the electronic device 300. When charging the battery 342, the charging management module 340 may further supply power to the electronic device by using the power management module 341.

The power management module 341 is configured to connect to the battery 342, the charging management module 340, and the processor 310. The power management module 341 receives input from the battery 342 and/or the charging management module 340, and supplies power to the processor 310, the internal memory 321, an external memory, the display 394, the camera 393, the wireless communications module 360, and the like. The power management module 341 may be further configured to monitor parameters such as a battery capacity, a quantity of battery cycles, and a battery health status (leakage and impedance). In some other embodiments, the power management module 341 may be alternatively disposed in the processor 310. In some other embodiments, the power management module 341 and the charging management module 340 may alternatively be disposed in a same component.

A wireless communications function of the electronic device 300 may be implemented through the antenna 1, the antenna 2, the mobile communications module 350, the wireless communications module 360, the modem processor, the baseband processor, and the like.

The antenna 1 and the antenna 2 are configured to transmit and receive electromagnetic wave signals. Each antenna in the electronic device 300 may be configured to cover one or more communications frequency bands. Different antennas can further be multiplexed to improve antenna utilization. For example, the antenna 1 may be multiplexed as a diversity antenna of a wireless local area network. In some other embodiments, the antenna may be used in combination with a tuning switch.

The mobile communications module 350 may provide 2G, 3G, 4G, 5G, or another wireless communications solution that is applied to the electronic device 300. The mobile communications module 350 may include at least one filter, a switch, a power amplifier, a low noise amplifier (LNA), and the like. The mobile communications module 350 may receive an electromagnetic wave through the antenna 1, perform processing such as filtering and amplification on the received electromagnetic wave, and transmit the processed electromagnetic wave to the modem processor for demodulation. The mobile communications module 350 may further amplify a signal obtained after modulation by the modem processor, and convert the signal into an electromagnetic wave through the antenna 1 for radiation. In some embodiments, at least some functional modules of the mobile communications module 350 may be disposed in the processor 310. In some embodiments, at least some functional modules of the mobile communications module 350 and at least some modules of the processor 310 may be disposed in a same component.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transferred to the application processor. The application processor outputs a sound signal through an audio device (not limited to the speakers 370A, the receiver 370B, or the like), or displays an image or a video through the display 394. In some embodiments, the modem processor may be an independent component. In some other embodiments, the modem processor may be independent of the processor 310, and disposed in a same component as the mobile communications module 350 or another functional module.

The wireless communications module 360 may provide a wireless communications solution that is applied to the electronic device 300, including a wireless local area network (WLAN) (for example, a Wireless Fidelity (Wi-Fi) network), Bluetooth (BT), a global navigation satellite system (GNSS), frequency modulation (FM), Near Field Communication (NFC), an infrared (IR) technology, and the like. The wireless communications module 360 may be one or more components integrating at least one communication processing module. The wireless communications module 360 receives an electromagnetic wave through the antenna 2, performs frequency modulation and filtering processing on the electromagnetic wave signal, and sends the processed signal to the processor 310. The wireless communications module 360 may further receive a to-be-sent signal from the processor 310, perform frequency modulation and amplification on the signal, and convert the signal into an electromagnetic wave through the antenna 2.

In some embodiments, the antenna 1 of the electronic device 300 is coupled to the mobile communications module 350, and the antenna 2 thereof is coupled to the wireless communications module 360, so that the electronic device 300 can communicate with a network and another device by using a wireless communications technology. The wireless communications technology may include Global System for Mobile Communications (GSM), a general packet radio service (GPRS), Code Division Multiple Access (CDMA), Wideband Code Division Multiple Access (WCDMA), Time-Division Code Division Multiple Access (TD-CDMA), Long Term Evolution (LTE), BT, a GNSS, a WLAN, NFC, FM, an IR technology, and/or the like. The GNSS may include Global Positioning System (GPS), Global Navigation Satellite System (GLONASS), BeiDou Navigation Satellite System (BDS), Quasi-Zenith Satellite System (QZSS) and/or a satellite based augmentation system (SBAS).

The electronic device 300 implements a display function by using the GPU, the display 394, the application processor, and the like. The GPU is a microprocessor for image processing, and is connected to the display 394 and the application processor. The GPU is configured to perform mathematical and geometric calculation for graphics rendering. The processor 310 may include one or more GPUs that execute program instructions to generate or change display information.

The display 394 is configured to display an image, a video, and the like. The display 394 is a touchscreen. The touchscreen is a curved screen with a radian on a side edge. The display 394 includes a display panel. The display panel may use a liquid crystal display (LCD), an organic light-emitting diode (OLED), an active-matrix organic light-emitting diode or active-matrix organic light-emitting diode (AMOLED), a flex light-emitting diode (FLED), a mini LED, a micro LED, a micro OLED, a quantum dot light-emitting diode (QLED), or the like.

The electronic device 300 may implement a photographing function by using the ISP, the camera 393, the video codec, the GPU, the display 394, the application processor, and the like.

The ISP is configured to process data fed back by the camera 393. For example, during photographing, a shutter is opened, a light ray is transferred to a photosensitive element of the camera through a lens, and an optical signal is converted into an electrical signal. The photosensitive element of the camera transfers the electrical signal to the ISP for processing, to convert the electrical signal into an image visible to naked eyes. The ISP may further perform algorithm optimization on noise, brightness, and a skin tone of the image. The ISP may further optimize parameters such as exposure and a color temperature of a photographed scene. In some embodiments, the ISP may be disposed in the camera 393.

The camera 393 is configured to capture a static image or a video. An object is projected to the photosensitive element by generating an optical image through the lens. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the electronic device 300 may include one or N cameras 393, where N is a positive integer greater than 1.

The digital signal processor is configured to process a digital signal, and may process other digital signals in addition to the digital image signal. For example, when the electronic device 300 performs frequency selection, the digital signal processor is configured to perform Fourier transform on frequency energy.

The video codec is configured to compress or decompress a digital video. The electronic device 300 may support one or more video codecs. In this way, the electronic device 300 may play or record videos in a plurality of coding formats, for example, Moving Picture Experts Group (MPEG) 1, MPEG 2, MPEG 3, and MPEG 4.

The NPU is a neural-network (NN) computing processor. By using a structure of a biological neural network as reference, for example, by using a transmission mode between human brain neurons as reference, the NPU quickly processes input information, and may further continuously perform self-learning. The NPU may implement intelligent cognition of the electronic device 300 and other applications, for example, image recognition, facial recognition, speech recognition, and text understanding.

The external memory interface 320 may be configured to connect to an external memory card, for example, a microSD card, to expand a storage capability of the electronic device 300. The external memory card communicates with the processor 310 through the external memory interface 320, to implement a data storage function. For example, music, video and other files are stored in the external memory card.

The internal memory 321 may be configured to store computer-executable program code, where the executable program code includes instructions. The processor 310 executes various function applications and data processing of the electronic device 300 by running the instructions stored in the internal memory 321. For example, in this embodiment of this application, the processor 310 may execute the instructions stored in the internal memory 321, and display corresponding display content on the display 384 (namely, a foldable screen) in response to a first operation or a second operation of the user on the display 394 (namely, a foldable screen). The internal memory 321 may include a program storage area and a data storage area. The program storage area may store an operating system, an application required by at least one function (for example, a sound playing function or an image playing function), and the like. The data storage area may store data (for example, audio data or a phone book) created in a process of using the electronic device 300. In addition, the internal memory 321 may include a high-speed random access memory, and may further include a non-volatile memory, for example, at least one magnetic disk storage device, a flash memory device, or a universal flash storage (UFS).

The electronic device 300 may implement an audio function, such as music playback or recording, by using the audio module 370, the speaker 370A, the telephone receiver 370B, the microphone 370C, the headset jack 370D, the application processor, and the like.

The audio module 370 is configured to convert digital audio information into an analog audio signal for output, and is also configured to convert analog audio input into a digital audio signal. The audio module 370 may be further configured to encode and decode audio signals. In some embodiments, the audio module 370 may be disposed in the processor 310, or some functional modules of the audio module 370 may be disposed in the processor 310. The speaker 370A, also referred to as a "horn", is configured to convert an audio electrical signal into a sound signal. The electronic device 300 may be used to listen to music or a hands-free call through the speaker 370A. The telephone receiver 370B, also referred to as an "earpiece", is configured to convert an audio electrical signal into a sound signal. When the electronic device 300 receives a call or voice information, a voice may be received by placing the telephone receiver 370B close to an ear. The microphone 370C, also referred to as a "MIC" or "mike", is configured to convert a sound signal into an electrical signal. When making a call or sending voice information or needing to trigger the electronic device 300 by using a voice assistant to perform some functions, a user may make a sound through a mouth by approaching the microphone 370C, and input the sound signal to the microphone 370C. The electronic device 300 may be provided with at least one microphone 370C. In some other embodiments, the electronic device 300 may be provided with two microphones 370C, so that a noise reduction function can be further implemented in addition to sound signal collection. In some other embodiments, the electronic device 300 may be alternatively provided with three, four, or more microphones 370C, to collect a sound signal, reduce noise, identify a sound source, implement a directional recording function, and the like.

The headset jack 370D is configured to connect to a wired headset. The headset jack 370D may be the USB interface 330, or may be a 3.5 mm Open Mobile Terminal Platform (OMTP) standard interface, or a Cellular Telecommunications Industry Association of the USA (CTIA) standard interface.

The pressure sensor 380A is configured to sense a pressure signal and may convert the pressure signal into an electrical signal. In some embodiments, the pressure sensor 380A may be disposed in the display 394. There are many types of pressure sensors, such as a resistive pressure sensor, an inductive pressure sensor, and a capacitive pressure sensor. The capacitive pressure sensor may be a parallel plate including at least two electrically conductive materials. When a force is applied to the pressure sensor 380A, a capacitance between electrodes changes. The electronic device 300 determines pressure strength based on the change of the capacitance. When a touch operation acts on the display 394, the electronic device 300 detects strength of the touch operation based on the pressure sensor 380A. The electronic device 300 may also calculate a touch position based on a detection signal of the pressure sensor 380A. In some embodiments, touch operations that act on a same touch position but have different touch operation strength may correspond to different operation instructions. For example, when a touch operation whose touch operation strength is less than a first pressure threshold acts on a short message application icon, an instruction for viewing a short message is executed. When a touch operation whose touch operation strength is greater than or equal to the first pressure threshold acts on the short message application icon, an instruction for creating a short message is executed.

The gyro sensor 380B may be configured to determine a motion posture of the electronic device 300. In some embodiments, an angular velocity of the electronic device 300 about three axes (namely, x, y, and z axes) may be determined by using the gyro sensor 380B. The gyro sensor 380B may be configured for stabilization during photographing. In this embodiment of this application, the display 394 (namely, the curved screen) of the electronic device 300 may include a gyro sensor (for example, the gyro sensor 380B), configured to measure an orientation (namely, a direction vector of an orientation) of the display 334. The orientation of the display 334 may be used to determine an included angle between the display 334 and a horizontal plane.

The magnetic sensor 380D includes a Hall effect sensor. The electronic device 300 may detect opening or closure of a flip leather cover by using the magnetic sensor 380D. The acceleration sensor 380E may detect magnitudes of accelerations of the electronic device 300 in all directions (usually on three axes). When the electronic device 300 is stationary, the acceleration sensor 380E may detect a magnitude and a direction of gravity.

The distance sensor 380F is configured to measure a distance. The electronic device 300 may measure a distance by infrared or laser light. For example, in this embodiment of this application, the electronic device 300 may measure a distance between the electronic device 300 and a face by using the distance sensor 380F.

The optical proximity sensor 380G may include, for example, a light emitting diode (LED) and a light detector such as a photodiode. The light emitting diode may be an infrared light emitting diode. The electronic device 300 emits infrared light through the light emitting diode. The electronic device 300 uses the photodiode to detect infrared reflected light from a nearby object. When sufficient reflected light is detected, the electronic device 300 may determine that there is an object near the electronic device 300. When detecting insufficient reflected light, the electronic device 300 may determine that there is no object near the electronic device 300.

The ambient light sensor 380L is configured to perceive ambient light brightness. The electronic device 300 may adaptively adjust brightness of the display 394 based on the perceived ambient light brightness. The ambient light sensor 380L may also be configured to automatically adjust white balance during photographing. The ambient light sensor 380L may also cooperate with the optical proximity sensor 380G to detect whether the electronic device 300 is in a pocket, to prevent mistouch.

The fingerprint sensor 380H is configured to collect a fingerprint. The electronic device 300 may implement fingerprint unlocking, access to an application lock, fingerprint-based photographing, fingerprint-based call answering, and the like by using features of the collected fingerprint.

The temperature sensor 380J is configured to detect a temperature. In some embodiments, the electronic device 300 executes a temperature processing policy by using the temperature detected by the temperature sensor 380J. For example, when the temperature reported by the temperature sensor 380J exceeds a threshold, the electronic device 300 performs performance reduction on a processor located near the temperature sensor 380J, to reduce power consumption and perform thermal protection. In some other embodiments, when the temperature is lower than another threshold, the electronic device 300 heats the battery 342, to avoid abnormal shutdown of the electronic device 300 caused by the low temperature. In some other embodiments, when the temperature is lower than still another threshold, the electronic device 300 boosts an output voltage of the battery 342 to avoid abnormal shutdown caused by the low temperature.

The touch sensor 380K may also be referred to as a "touch panel". The touch sensor 380K may be disposed in the display 394, and the touch sensor 380K and the display 394 constitute a touchscreen, also called a "touch screen". The touch sensor 380K is configured to detect a touch operation acting on or near the touch sensor 380K. The touch sensor may transfer the detected touch operation to the application processor, to determine a touch event type. Visual output related to the touch operation may be provided through the display 394. In some other embodiments, the touch sensor 380K may be alternatively disposed on a surface of the electronic device 300, and a position of the touch sensor 380K is different from that of the display 394.

The bone conduction sensor 380M may obtain a vibration signal. In some embodiments, the bone conduction sensor 380M may obtain a vibration signal of a human bone block for vocal vibration. The bone conduction sensor 380M may also come into contact with a pulse of a human body and receive a blood pressure pulse signal.

The key 390 includes a power key, a volume key, and the like. The key 390 may be a mechanical key, or may be a touch key. The electronic device 300 may receive key input to generate key signal input related to user settings and function control of the electronic device 300. The motor 391 may generate a vibration prompt. The motor 391 may be configured for an incoming call vibration prompt, or may be configured for touch vibration feedback. The indicator 392 may be an indicator lamp, and may be configured to indicate a charging status or a battery power change, or may be configured to indicate a message, a missed call, a notification, or the like. The SIM card interface 395 is configured to connect to a SIM card. The SIM card may be inserted into or removed from the SIM card interface 395, to implement contact with and separation from the electronic device 300.

The methods in the following embodiments may be implemented in the electronic device 300 having the foregoing hardware structure.

Figure 4:
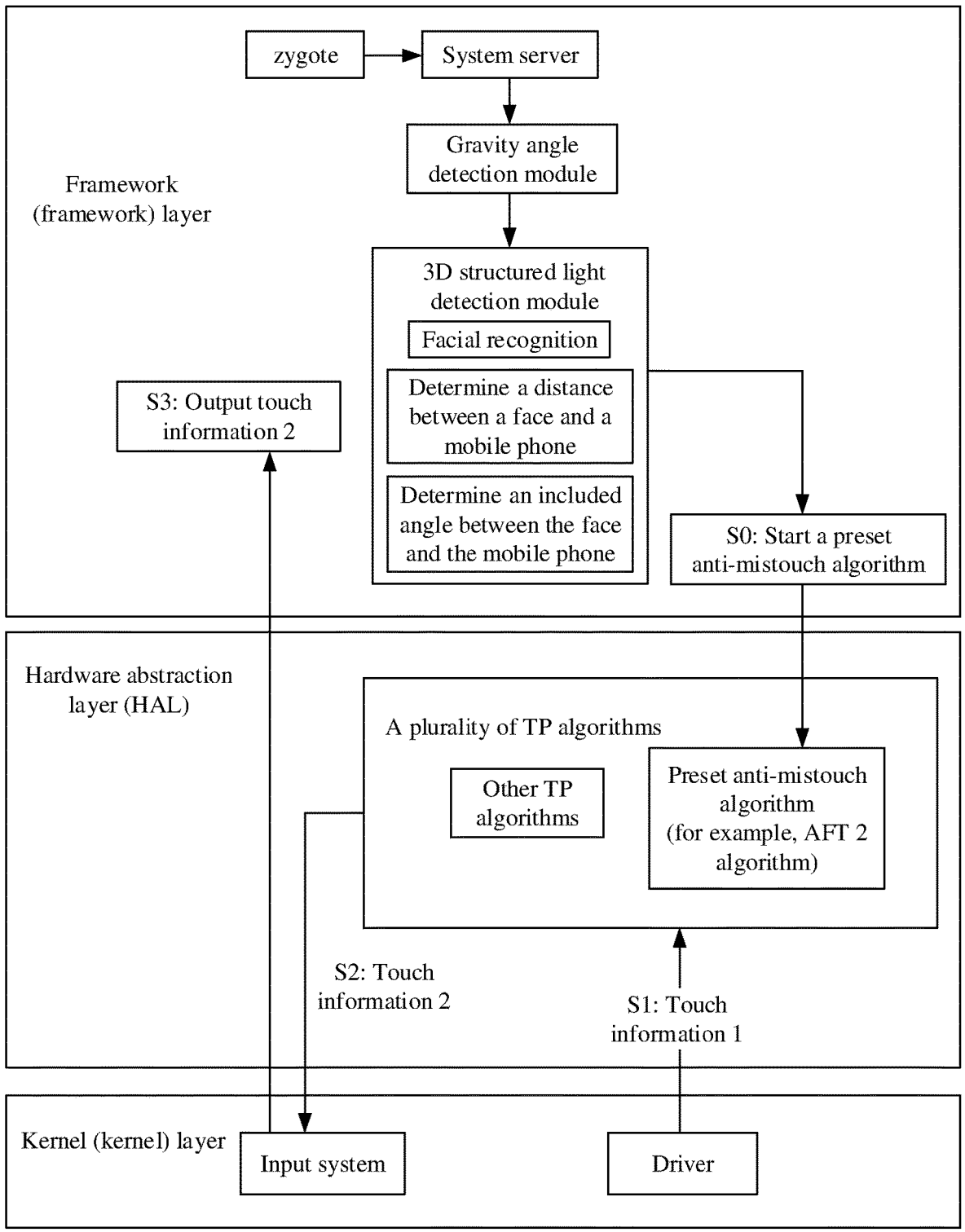
FIG. 4 is a schematic architectural diagram of a software system of an electronic device according to an embodiment of this application.

Referring to FIG. 4, an Android system is used as an example to show a schematic architectural diagram of a software system of an electronic device 300 according to an embodiment of this application. As shown in FIG. 4, the software system of the electronic device 300 may include a framework layer, a hardware abstraction layer (HAL), and a kernel layer.

A display (for example, a touchscreen) of a mobile phone includes a touch sensor, configured to collect a touch operation of a user on the touchscreen, and obtain touch information (for example, touch information 1) corresponding to the touch operation. The touch information may include information such as a size and position information of a touch surface corresponding to the touch operation, and a pressing force of the touch operation. After the touch sensor collects the touch information 1, a driver of the kernel layer (for example, a driver of the touch sensor) may report the touch information 1 to the hardware abstraction layer HAL (namely, perform S1 shown in FIG. 4). The hardware abstraction layer HAL includes a plurality of TP algorithms, for example, a calibration algorithm and the preset anti-mistouch algorithm in this embodiment of this application. The TP algorithm in the hardware abstraction layer HAL may perform processing (including anti-mistouch processing) on the touch information 1, to obtain touch information 2. Then, the hardware abstraction layer HAL may send the touch information 2 to an input system of the Kernel layer (namely, perform S2 shown in FIG. 4). After receiving the touch information 2, the input system of the kernel layer may report the touch information to an upper layer (for example, the framework layer), and the upper layer responds to the touch operation based on the touch information.

In this embodiment of this application, when the mobile phone is in a preset mistouch scenario, the mobile phone may start the preset anti-mistouch algorithm in the plurality of TP algorithms, and the hardware abstraction layer HAL performs the anti-mistouch processing described in this embodiment of this application on the touch information 1 by using the preset anti-mistouch algorithm.

For example, that the mobile phone is in a preset anti-mistouch scenario may be specifically: An included angle between the touchscreen of the mobile phone and a horizontal plane falls within a first preset angle range; and a camera of the mobile phone collects a face image of the user, a distance between the touchscreen of the mobile phone and a face of the user is less than a first distance threshold, and a face yaw degree of the user falls within a second preset angle range. The face yaw degree of the user is a left-right rotation angle of a face orientation of the user relative to a first connecting line, and the first connecting line is a connecting line between the camera of the mobile phone and a head of the user.

In this embodiment of this application, a working principle of the preset anti-mistouch algorithm started by an electronic device (for example, a mobile phone) in this embodiment of this application is described herein with reference to the software system architecture shown in FIG. 4. When the mobile phone is powered on, a system service (system server, namely, system_server, SS for short) process may be started by using a zygote process. The SS process is used to determine whether the mobile phone is in the preset mistouch scenario. If the SS process determines that the mobile phone is in the preset mistouch scenario, the preset anti-mistouch algorithm may be started.

For example, after the mobile phone is powered on, a gravity angle detection module (for example, a gyro sensor) of the mobile phone may collect an included angle between a curved screen of the mobile phone and a horizontal plane. As shown in FIG. 4, the SS process monitors a change of the included angle collected by the gravity angle detection module. If the SS process detects that the included angle between the curved screen of the mobile phone and the horizontal plane falls within the first preset angle range, a 3D structured light detection module may be started. The 3D structured light detection module may include a camera, a distance sensor, an infrared light sensor, and the like. The 3D structured light detection module collects a face image, a distance between a face and the mobile phone, and an included angle between the face and the mobile phone (namely, a face yaw degree). Specifically, if the camera of the mobile phone collects a face image of a user, a distance between the curved screen of the mobile phone and a face of the user is less than the first distance threshold, and a face yaw degree of the user falls within the second preset angle range, the SS process may start the preset anti-mistouch algorithm, namely, perform S0 shown in FIG. 4.

For example, the preset anti-mistouch algorithm may be an AFT 2SA algorithm (algorithm). The preset anti-mistouch algorithm may be integrated in a TP daemon (namely, a daemon process) at the HAL layer. The preset anti-mistouch algorithm is used to determine positions and a shape of a contact surface corresponding to touch operations collected by a TP, namely, identify a preset touch operation (for example, the touch operations corresponding to the contact surface 1 and the contact surface 2) from the touch operations collected by the TP.

When an Android system is started, after a Linux kernel is fully loaded, an init process is started first, and then the init process loads an Android file system, creates a system directory, initializes an attribute system, and starts some daemons. The zygote process is the most important daemon. The SS process is the first process forked from the zygote process and is a core process of the entire Android system.

The following specifically describes the technical solutions provided in the embodiments of this application by using an example in which the electronic device is a mobile phone. A touchscreen of the mobile phone is a curved screen with a radian on a side edge. An anti-mistouch method of the curved screen may include: (1) a preset anti-mistouch scenario determining procedure; and (2) an anti-mistouch processing procedure.

The mobile phone may first perform the (1) preset anti-mistouch scenario determining procedure, to determine whether the mobile phone is in a preset anti-mistouch scenario. If the mobile phone is in the preset anti-mistouch scenario, the mobile phone may perform the (2) anti-mistouch processing procedure, start a preset anti-mistouch algorithm, and perform anti-mistouch processing on a preset mistouch operation.

Figure 5:
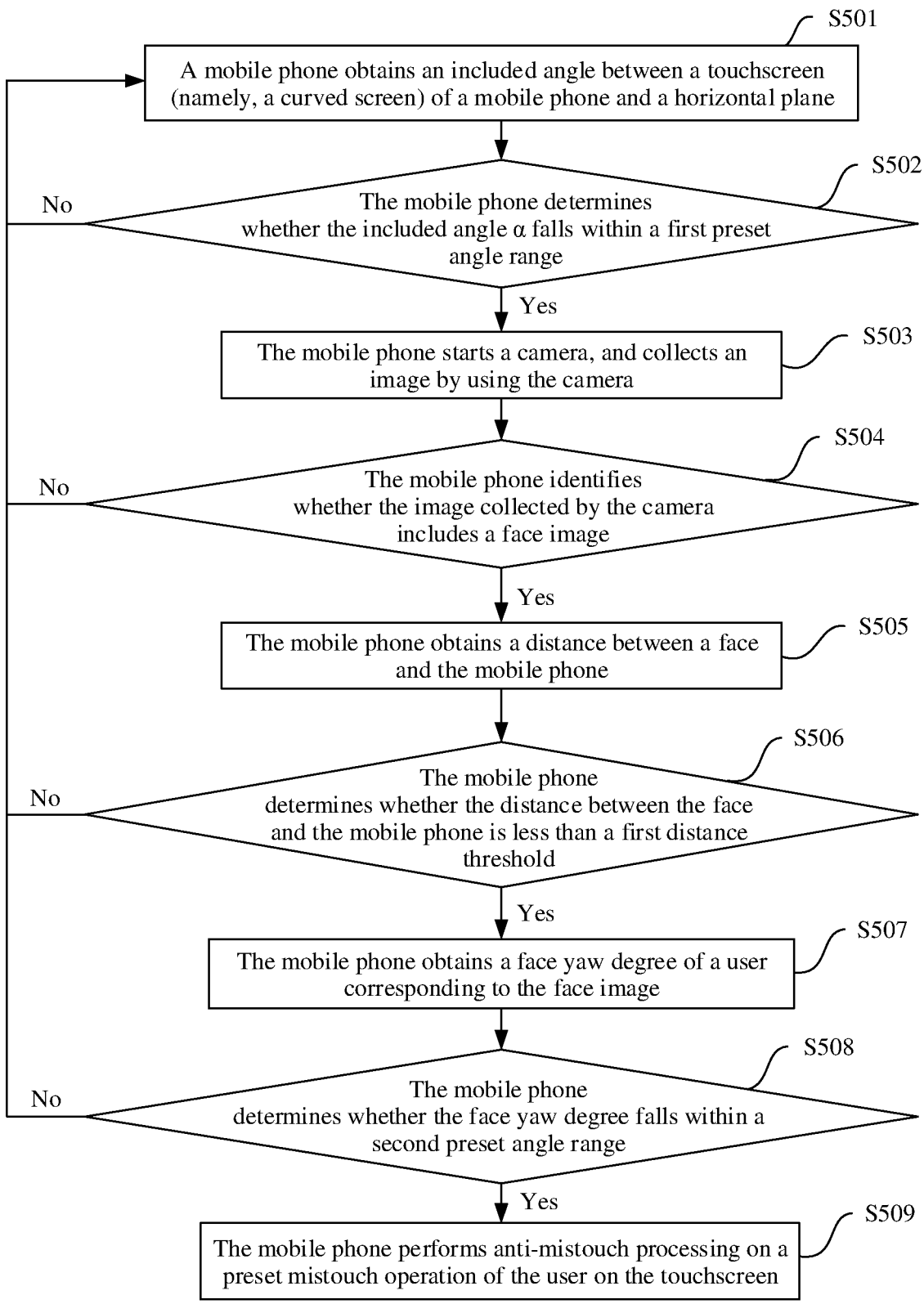
FIG. 5 is a flowchart of an anti-mistouch method of a curved screen according to an embodiment of this application.

As shown in FIG. 5, the (1) preset anti-mistouch scenario determining procedure may include S501 to S508.

S501. The mobile phone obtains an included angle α between the touchscreen (namely, the curved screen) of the mobile phone and the horizontal plane.

For example, the mobile phone may include a gyro sensor. The gyro sensor is configured to measure an orientation (namely, a direction vector of an orientation) of the touchscreen. The mobile phone may determine the included angle between the touchscreen (namely, the curved screen) of the mobile phone and the horizontal plane based on the orientation of the touchscreen.

In this embodiment of this application, a principle in which the gyro sensor measures the orientation (namely, the direction vector a of the orientation) of the touchscreen and the mobile phone calculates the included angle α between the touchscreen (namely, the curved screen) of the mobile phone and the horizontal plane based on the orientation of the touchscreen is described herein.

A coordinate system of the gyro sensor is a geographic coordinate system. As shown in FIG. 6(b), an origin O of the geographic coordinate system is a point located on a carrier (namely, a device including the gyro sensor, such as the mobile phone). An x-axis points east (E) along a local latitude line, a y-axis points north (N) along a local meridian line, and a z-axis points upward along a local geographic vertical line, and forms a right-hand rectangular coordinate system with the x-axis and the y-axis. A plane formed by the x-axis and the y-axis is a local horizontal plane, and a plane formed by the y-axis and the z-axis is a local meridian plane. For example, as shown in FIG. 6(a), an xOy plane is a local horizontal plane, and an yOz plane is a local meridian plane.

Therefore, it can be understood that, the coordinate system of the gyro sensor is: using the gyro sensor as the origin O, pointing east along the local latitude to form the x-axis, pointing north along the local meridian line to form the y-axis, and pointing upward along the local geographic vertical line (namely, the opposite direction of the geographic vertical line) to form the z-axis.

The mobile phone may obtain, through measurement by using the gyro sensor disposed in the touchscreen, a direction vector of an orientation of the touchscreen in the coordinate system of the gyro sensor disposed on the touchscreen. For example, referring to a 3D diagram of the mobile phone shown in FIG. 6(a), the direction vector of the orientation of the touchscreen (namely, the curved screen) obtained through measurement by the mobile phone in the coordinate system of the gyro sensor is a vector a. The mobile phone may calculate an included angle θ between the vector a and the horizontal plane.

Figure 6A:
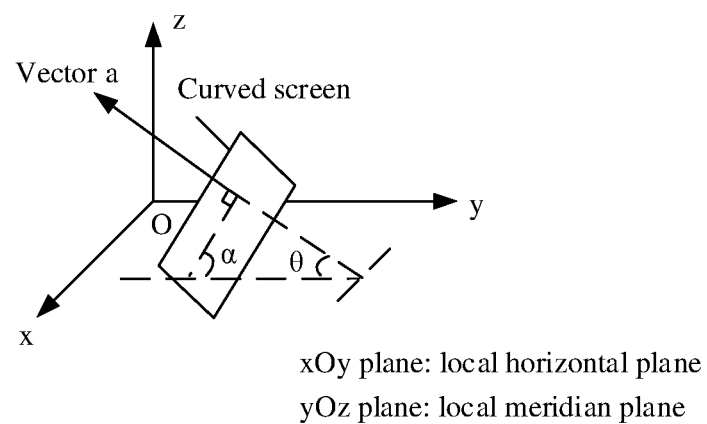
FIG. 6(a) and FIG. 6(b) are a schematic diagram of a gyro coordinate system and a geographic coordinate system according to an embodiment of this application.
Figure 6B:
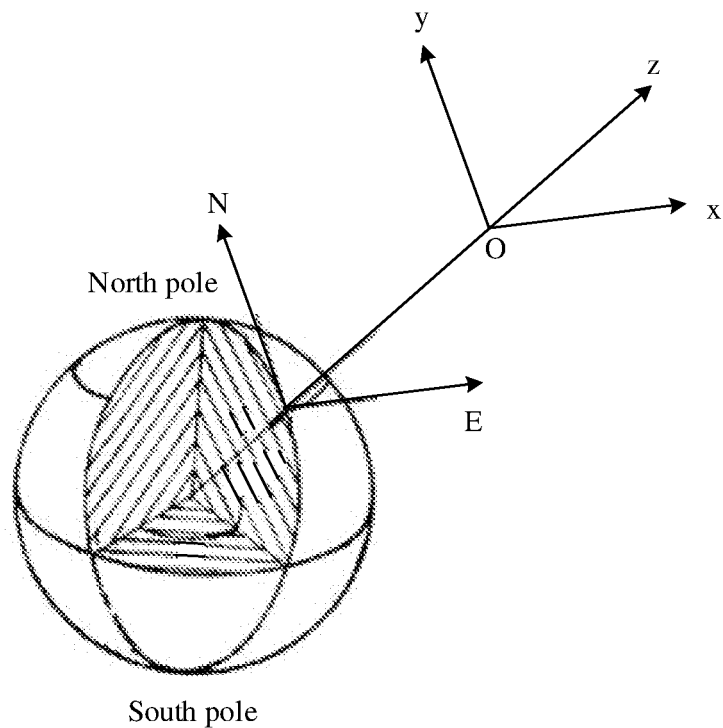

Based on FIG. 6(a), it can be learned that, because the vector a is perpendicular to the curved screen, it may be learned that the included angle between the curved screen and the horizontal plane is α=90°−θ. In other words, the mobile phone may determine the included angle α between the curved screen and the horizontal plane based on the direction vector (namely, the vector a) of the orientation of the curved screen obtained through measurement in the coordinate system of the gyro sensor.

It should be noted that, in this embodiment of this application, a method for obtaining the included angle between the touchscreen (namely, the curved screen) of the mobile phone and the horizontal plane by the mobile phone includes but is not limited to the foregoing method for obtaining the included angle by using the gyro sensor.

S502. The mobile phone determines whether the included angle α falls within a first preset angle range.

In this embodiment of this application, a value range of the included angle α between the touchscreen of the mobile phone and the horizontal plane when the user uses the mobile phone in the foregoing scenario (1) and scenario (2) may be counted, to determine the first preset angle range.

In scenario (1), the user lies flat and holds the mobile phone with one hand. Generally, when the user lies flat and holds the mobile phone, the included angle α between the touchscreen of the mobile phone and the horizontal plane is close to 0°. Therefore, for scenario (1), the first preset angle range may be an angle range with values about 0°. For example, the first preset angle range may be [−n°, n°]. For example, a value range of n may be (0, 10), (0, 5), (0, 20), or (0, 15). For example, when the value range of n is (0, 20), n=10, n=15, or n=5.

In scenario (2), the user lies on one side and holds the mobile phone with one hand. Generally, when the user lies on one side and holds the mobile phone, the included angle α between the touchscreen of the mobile phone and the horizontal plane is close to 90°. Therefore, for scenario (2), the first preset angle range may be an angle range with values about 90°. For example, the first preset angle range may be [90°−m°, 90°+m°]. For example, a value range of m may be (0, 10), (0, 5), (0, 20), or (0, 15). For example, when the value range of m is (0, 15), m=5, m=8, or m=12.

In conclusion, the first preset angle range may include two angle ranges: [−n°, n°] and [90°−m°, 90°+m°]. The mobile phone may determine whether the included angle α is within any angle range of [−n°, n°] or [90°−m°, 90°+m°]. If the included angle α is within [−n°, n°] or [90°−m°, 90°+m°], the mobile phone may continue to perform S503.

It can be understood that, if the included angle α is within [−n°, n°] or [90°−m°, 90°+m°], it indicates that the mobile phone is more likely held by the user in the foregoing scenario (1) or scenario (2). In this case, it is highly possible that a mistouch is caused on the side edge of the curved screen by the user holding the mobile phone. Therefore, the mobile phone may determine whether a relative state between the user and the mobile phone meets a preset condition. If the relative state between the user and the mobile phone meets the preset condition, it indicates that the mobile phone is held by the user in the foregoing scenario (1) or scenario (2). In this case, the mobile phone may start the preset anti-mistouch algorithm, and implement anti-mistouch on the side edge of the curved screen by using the preset anti-mistouch algorithm.

In some embodiments, that the relative state between the user and the mobile phone meets the preset condition may be specifically: The mobile phone may collect a face image by using the camera, and a face yaw degree of the user corresponding to the face image falls within the second preset angle range.

The face yaw degree of the user is a left-right rotation angle of a face orientation of the user relative to a first connecting line, and the first connecting line is a connecting line between the camera of the mobile phone and a head of the user. It should be noted that, for detailed descriptions of the face yaw degree, refer to content in subsequent embodiments. Details are not described herein in this embodiment of this application.

In some other embodiments, that the relative state between the user and the mobile phone meets the preset condition may be specifically: The mobile phone may collect a face image by using the camera, a distance between a face corresponding to the face image and the mobile phone is less than a first distance threshold, and a face yaw degree of the user corresponding to the face image falls within the second preset angle range.

As shown in FIG. 5, after S502, if the included angle α falls within the first preset angle range, the mobile phone may perform S503 to S509.

S503. The mobile phone starts the camera, and collects an image by using the camera.

S504. The mobile phone identifies whether the image collected by the camera includes a face image.

It should be noted that, for a method in which the mobile phone starts the camera, collects an image by using the camera, and identifies whether the image collected by the camera includes a face image, refer to a specific method in a conventional technology. Details are not described herein in this embodiment of this application.

Specifically, if the image collected by the camera includes a face image, the mobile phone continues to perform S505. If the image collected by the camera includes no face image, the mobile phone performs S501.

S505. The mobile phone obtains a distance between a face and the mobile phone.

In some embodiments, the camera may be a structured light camera module. The structured light camera module includes a light projector and two cameras (for example, a first camera and a second camera). The light projector is configured to transmit optical information to a target object (for example, a face). The first camera and the second camera are configured to photograph the target object. The first camera and the second camera may also be referred to as a binocular camera. The mobile phone may calculate, based on an image of the target object (for example, a face) collected by the binocular camera, depth information of the target object, and then determine a distance between the target object (for example, the face) and the mobile phone based on the depth information of the target object.

Generally, the target object (for example, the face) is an object having a three-dimensional form. When the camera of the mobile phone photographs the target object, distances between features (for example, a nose tip and eyes of a person) on the target object and the camera may be different. A distance between each feature on the target object and the camera is referred to as a depth of the feature (or a point at which the feature is located). Depths of points on the target object form the depth information of the target object. The depth information of the target object may represent a three-dimensional feature of the target object.

Figure 7:
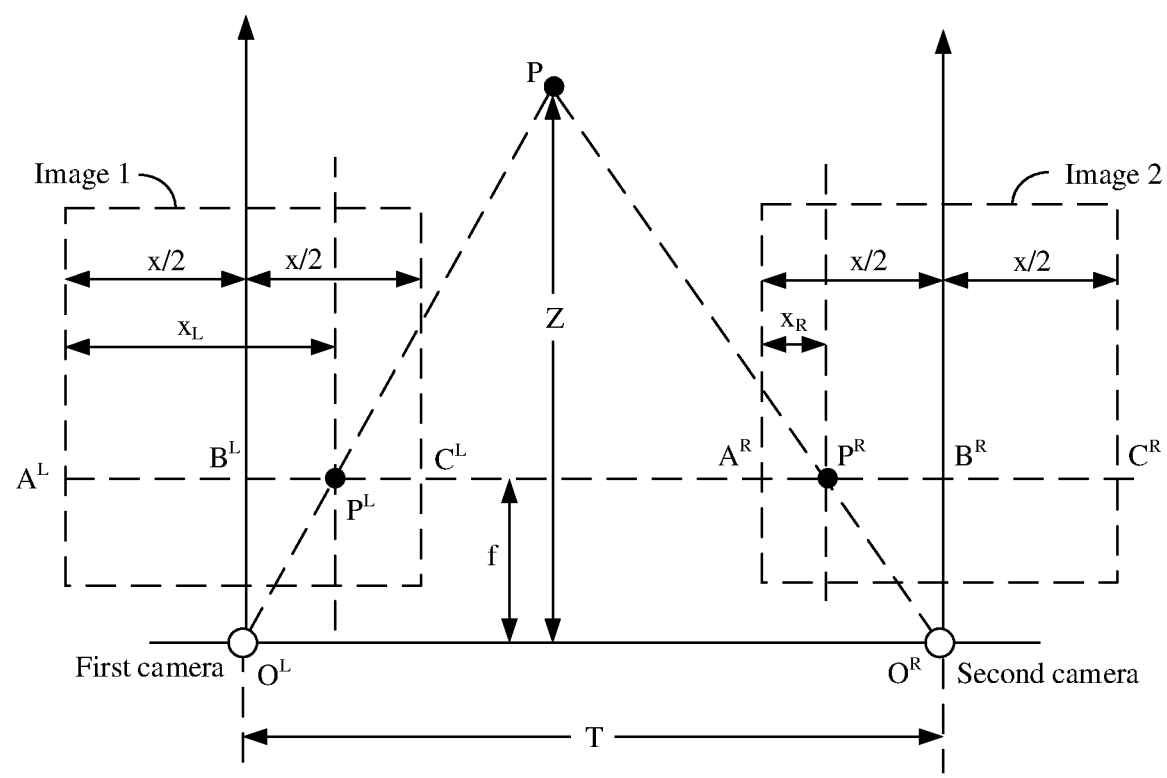
FIG. 7 is a schematic diagram of a calculation principle of depth information according to an embodiment of this application.

For the first camera and the second camera, the distance (namely, a depth of a point) between each feature on the target object and the camera may be a vertical distance between a point at which each feature on the target object is located and a connecting line between the two cameras. For example, as shown in FIG. 7, it is assumed that P is a feature on the target object, and a depth of the feature P is a vertical distance Z from P to $O^L O^R$. $O^L$ is a position of the first camera, and $O^L$ is a position of the second camera.

The mobile phone may calculate a depth of each feature on the target object by using a triangulation location principle based on a parallax of the binocular camera on a same feature in combination with a hardware parameter of the binocular camera, to obtain the depth information of the target object.

In this embodiment of this application, a method for calculating depth information by the mobile phone based on the parallax is described herein by using an example.

Positions of the first camera and the second camera in the structured light camera module are different. For example, as shown in FIG. 7, $O^L$ is the position of the first camera, $O^R$ is the position of the second camera, and a distance between $O^L$ and $O^R$ is a first length T, namely, $O^L O^R$=T. Both lens focal lengths of the first camera and the second camera are f.

The feature P is a feature of the target object. A vertical distance between a point at which the feature P is located and the connecting line between the first camera and the second camera is Z. In other words, depth information of P is Z. The first camera collects an image 1 of the target object, and the feature P is at a point $P^L$ of the image 1. The second camera collects an image 2 of the target object, and the feature P is at a point $P^R$ of the image 2. Features corresponding to the point $P^L$ in the image 1 and the point $P^R$ in the image 2 are both the feature P of the target object.

As shown in FIG. 7, $A^L C^L = A^R C^R = x$, and $A^L B^L = B^L C^L = A^R B^R = B^R C^R = x/2$. A distance between a feature $P^L$ and $A^L$ is $x_L$, namely, a distance between the feature $P^L$ and a leftmost end of the image 1 is $x_L$, namely, $A^L P^L = x_L$. A distance between a feature $P^R$ and $A^R$ is $x_R$, namely, a distance between the feature $P^R$ and a leftmost end of the image 2 is $x_R$, namely, $A^R P^R = x_R$. A difference between $A^L P^L$ and $A^R P^R$ is a parallax of the first camera and the second camera for the feature P, namely, a parallax of the feature P is $d = x_L - x_R$.

$P^L P^R$ is parallel to $O^L O^R$. Therefore, the following formula (1) may be obtained based on a triangle principle:

$$\frac{P^L P^R}{O_L O_R} = \frac{Z-f}{Z} \quad \text{formula (1)}$$

$$P^L P^R = O_L O_R - B^L P^L - P^R B^R \cdot O^L O^R = T,$$

$$B^L P^L = A^L P^L - A^L B^L = x_L - x/2,$$

$$\text{and } P^R B^R = x/2 - x_R \cdot P^L P^R =$$

$$T - (x_L - x/2) - (x/2 - x_R) = T - (x_L - x_R) = T - d.$$

$P^L P^R = T - d$ and $O^L O^R = T$ may be substituted into formula (1) to obtain:

$$\frac{T - (x_L - x_R)}{T} = \frac{T - d}{T} = \frac{Z - f}{Z}; \text{ and } Z = \frac{f \times T}{d}.$$

It can be learned from $$Z = \frac{f \times T}{d}$$

that, a depth Z of the feature P may be obtained through calculation by using the distance T between the two cameras, the lens focal lengths f of the two cameras, and the parallax d.

It can be learned from the foregoing description that, a larger number of features or higher feature saliency in image information (namely, first image information, such as the image 1) collected by the first camera and image information (namely, second image information, such as the image 2) collected by the second camera indicates that more same features are identified in the image 1 and the image 2 by the mobile phone. If more same features are identified by the mobile phone, the mobile phone may obtain, through calculation, more depths of points at which the features are located. The depth information of the target object is formed by depths of a plurality of points (namely, features) of the target object. Therefore, if more depths of points are obtained by the mobile phone through calculation, the depth information of the target object is more accurate.

A same feature in the two images refers to information corresponding to a same feature in the two images. For example, a point $A^L$ in the image 1 shown in FIG. 7 corresponds to a left eye corner of a face, and a point $A^R$ in the image 2 also corresponds to the left eye corner of the same face. A point $B^L$ corresponds to a right eye corner of the face, and a point $B^R$ also corresponds to the right eye corner of the face. A parallax of the binocular camera on the left eye corner of the face is $x_{L1} - x_{R1}$. A parallax of the binocular camera on the right eye corner of the face is $x_{L2} - x_{R2}$.

In some embodiments, the mobile phone may use a depth of any feature (for example, a nose tip, a left eye corner, an eyebrow center, a left eyeball, a right eye corner, a left mouth corner, or a right mouth corner) in the face as a distance between the face and the mobile phone.

In some other embodiments, after obtaining the depth information of the face (including depths of a plurality of features of the face), the mobile phone may calculate an average value of the depths of the plurality of features, and use the average value as the distance between the face and the mobile phone.

It should be noted that, that the mobile phone starts the camera in S503 may be specifically: The mobile phone starts the structured light camera module, where the structured light camera module is configured to collect an image, and is used for the mobile phone to calculate depth information of a face when the collected image includes a face image. Alternatively, in S503, the mobile phone may start only one camera (for example, the first camera). If the mobile phone identifies that an image collected by the first camera includes a face image, the light projector and the other camera (for example, the second camera) may be started, so that the mobile phone calculates depth information of a face. Alternatively, in addition to the structured light camera module, the mobile phone may further include a camera (for example, a third camera). In S503, the mobile phone may start the third camera. If the mobile phone identifies that an image collected by the third camera includes a face image, the structured light camera module may be started, and used for the mobile phone to calculate depth information of a face.

In some other embodiments, the mobile phone may obtain the distance between the face and the mobile phone by using a distance sensor (for example, the distance sensor 380F). The distance sensor is configured to measure a distance. The distance sensor is configured to transmit and receive infrared or laser light, and the mobile phone may measure a distance based on the infrared or the laser light (for example, energy of the infrared or the laser light) received by the distance sensor.

S506. The mobile phone determines whether the distance between the face and the mobile phone is less than a first distance threshold.

The first distance threshold varies in the foregoing scenario (1) and scenario (2). For example, in scenario (1), the first distance threshold may be 20 centimeters (cm); and in scenario (2), the first distance threshold may be 15 cm. Certainly, the first distance threshold is not limited to 15 cm and 20 cm. The first distance threshold may be obtained by collecting statistics on distances between the mobile phone and faces when a large quantity of users use mobile phones in the foregoing scenario (1) and scenario (2). Alternatively, the first distance threshold may be set by the user in the mobile phone.

Specifically, if the distance between the face and the mobile phone is less than the first distance threshold, the mobile phone continues to perform S507. If the distance between the face and the mobile phone is greater than or equal to the first distance threshold, the mobile phone performs S501.

S507. The mobile phone obtains a face yaw degree of a user corresponding to the face image.

The face yaw degree of the user is a left-right rotation angle of a face orientation of the user relative to a first connecting line, and the first connecting line is a connecting line between the camera of the mobile phone and a head of the user.

The face yaw degree is a deviation angle between the face orientation of the user and "the connecting line between the camera and the head of the user" (namely, the first connecting line). The face yaw degree may also be the left-right rotation angle of the face orientation of the user relative to the first connecting line. For example, the connecting line between the camera and the head of the user may be a connecting line between the camera and any organ (for example, a nose or a mouth) on the head of the user.

Figure 8A:
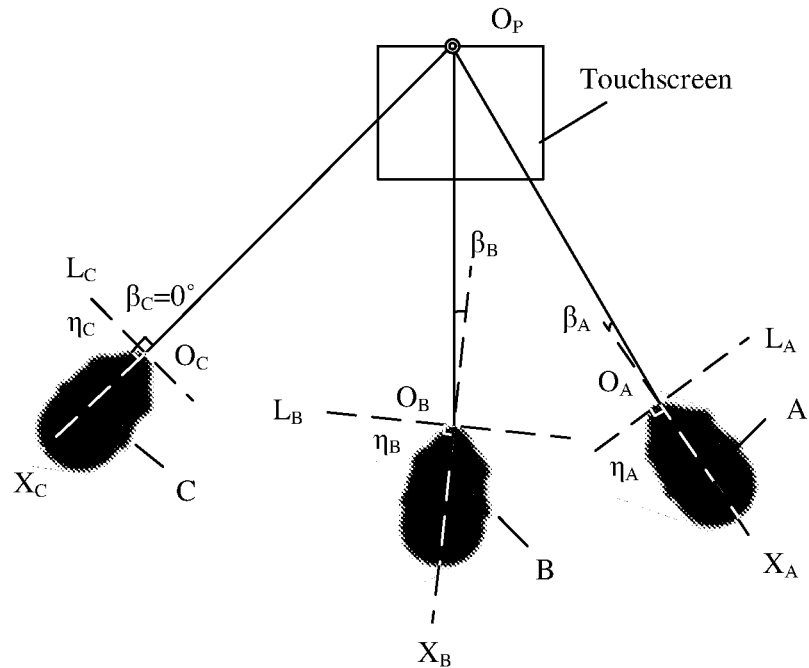
FIG. 8(a) and FIG. 8(b) are a schematic diagram of a face yaw degree according to an embodiment of this application.
Figure 8B:
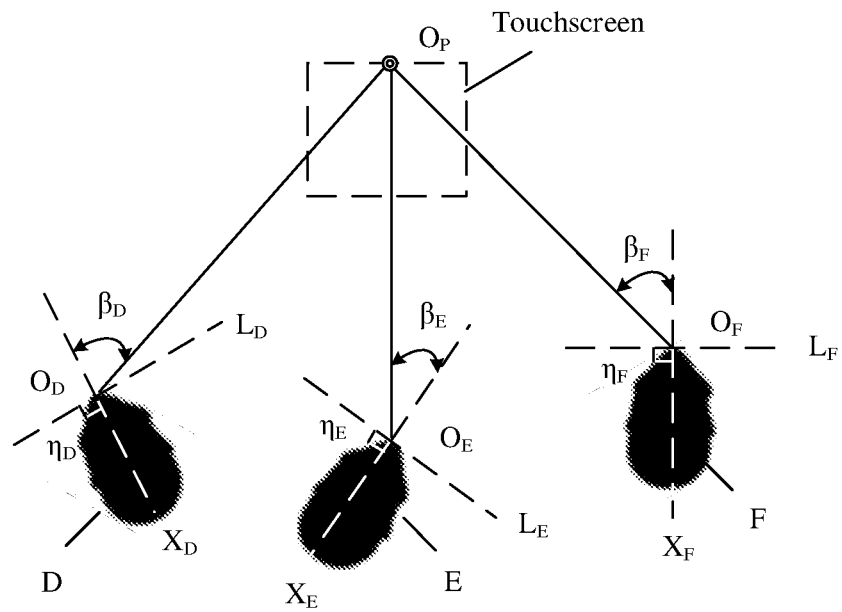

For example, as shown in FIG. 8(*a*), a user A is used as an example. $O_PO_A$ is a connecting line between the camera and a head of the user A, and $X_AO_A$ indicates a face orientation of the user A. $L_AO_A$ is perpendicular to a straight line $X_AO_A$ in which the face orientation of the user A is located, and $\eta_A=90°$. A face yaw degree $\beta_A$ of the user A is an included angle between $X_AO_A$ and $O_PO_A$. A user B is used as an example. $O_PO_B$ is a connecting line between the camera and a head of the user B, and $X_BO_B$ indicates a face orientation of the user B. $L_BO_B$ is perpendicular to a straight line $X_BO_B$ in which the face orientation of the user B is located, and $\eta_B=90°$. A face yaw degree $\beta_B$ of the user B is an included angle between $X_BO_B$ and $O_PO_B$. A user C is used as an example. $O_PO_C$ is a connecting line between the camera and a head of the user C, and $X_CO_C$ indicates a face orientation of the user C. $L_CO_C$ is perpendicular to a straight line $X_CO_C$ in which the face orientation of the user C is located, and $\eta_C=90°$. A face yaw degree $\beta_C$ of the user C is an included angle between $X_CO_C$ and $O_PO_C$.

For another example, as shown in FIG. 8(*b*), a user D is used as an example. $O_PO_D$ is a connecting line between the camera and a head of the user D, and $X_DO_D$ indicates a face orientation of the user D. $L_DO_D$ is perpendicular to a straight line $X_DO_D$ in which the face orientation of the user D is located, and $\eta_D=90°$. A face yaw degree $\beta_D$ of the user D is an included angle between $X_DO_D$ and $O_PO_D$. A user E is used as an example. $O_PO_E$ is a connecting line between the camera and a head of the user E, and $X_EO_E$ indicates a face orientation of the user E. $L_EO_E$ is perpendicular to a straight line $X_EO_E$ in which the face orientation of the user E is located, and $\eta_E=90°$. A face yaw degree $\beta_E$ of the user E is an included angle between $X_EO_E$ and $O_PO_E$. A user F is used as an example. $O_PO_F$ is a connecting line between the camera and a head of the user F, and $X_FO_F$ indicates a face orientation of the user F. $L_FO_F$ is perpendicular to a straight line $X_FO_F$ in which the face orientation of the user F is located, and $\eta_F=90°$. A face yaw degree $\beta_F$ of the user F is an included angle between $X_FO_F$ and $O_PO_F$.

S508. The mobile phone determines whether the face yaw degree falls within a second preset angle range.

Referring to FIG. 8(*a*) and FIG. 8(*b*), it can be learned that if the face yaw degree is closer to 0 degrees, it is more likely that the user focuses on the touchscreen of the mobile phone. For example, as shown in FIG. 8(*a*), the face yaw degree $\beta_C$ of the user C is 0°, and the face yaw degree $\beta_A$ of the user A and the face yaw degree $\beta_B$ of the user B are close to 0°. Therefore, it is quite likely that the user A, the user B, and the user C shown in FIG. 8(*a*) focus on the touchscreen of the mobile phone.

Referring to FIG. 8(*a*) and FIG. 8(*b*), it can be learned that a larger absolute value of the face yaw degree indicates a lower probability that the user focuses on the touchscreen of the mobile phone. For example, an absolute value of the face yaw degree $\beta_D$ of the user D, an absolute value of the face yaw degree $\beta_E$ of the user E, and an absolute value of the face yaw degree $\beta_F$ of the user F are all relatively large. Therefore, it is less likely that the user D, the user E, and the user F shown in FIG. 8(*b*) focus on the touchscreen of the mobile phone.

It can be learned from the foregoing description that, the second preset angle range may be an angle range with values about 0°. For example, the second preset angle range may be [−k°, k°] For example, a value range of k may be (0, 10) or (0, 5). For example, k=2, k=1, or k=3.

For example, the mobile phone may obtain, in a face detection manner, a face feature of a face image collected by a camera (for example, the third camera). The face feature may include the foregoing face yaw degree. Specifically, the face feature may further include face position information (faceRect), face feature point information (landmarks), and face pose information. The face pose information may include a face pitch angle (pitch), an in-plane rotation angle (roll), and a face yaw degree (namely, a left-right rotation angle, yaw).

The mobile phone may provide an interface (for example, a face detector interface), and the interface may receive a picture photographed by the camera. Then, a processor (for example, an NPU) of the mobile phone may perform face detection on the image, to obtain the face feature. Finally, the mobile phone may return a detection result (JSON object), namely, the face feature.

For example, the following is an example of the detection result (JSON) returned by the mobile phone in this embodiment of this application.

```
{"resultCode":0,
"faces":[{
"faceRect":{"height":1795, "left":761, "top":1033, "width":1496}, #Face position information#
    "id":0,                                  #Face ID#
    "landmarks":[
    {"position":{"x":1235, "y":1745},"type":0}, #coordinates of a center position of a left eye are (1235, 1745)#
    {"position":{"x":1752, "y":1700},"type":1}, #coordinates of a center position of a right eye are (1752, 1700)#
    {"position":{"x":1487, "y":2055},"type":2}, #coordinates of a position of a nose are (1487, 2055)#
    {"position":{"x":1314, "y":2357},"type":3}, #coordinates of a position of a left mouth corner are (1314, 2357)#
    {"position":{"x":1774, "y":2321},"type":4} #coordinates of a position of a right mouth corner are (1774, 2321)#
        ],
    "pitch":-2.9191732,
    "probability":1,
    "roll":2.732926,
    "yaw":0.44898167
        }]
}
```

In the foregoing code, ""id":0" indicates that a face ID corresponding to the face feature is 0. One picture (for example, the picture) may include one or more face images. The mobile phone may allocate different IDs to the one or more face images, to identify the face images.

""height":1795" indicates that a height of a face image (namely, a face region in which the face image is located in the image) is 1795 pixels. ""left":761" indicates that a distance between the face image and a left boundary of the picture is 761 pixels. ""top":1033" indicates that a distance between the face image and an upper boundary of the picture is 1033 pixels. "width":1496" indicates that a width of the face image is 1496 pixels. ""pitch":-2.9191732" indicates that a face pitch angle of the face image whose face ID is 0 is -2.9191732°. "roll":2.732926" indicates that an in-plane rotation angle of the face image whose face ID is 0 is 2.732926°.

""yaw":0.44898167" indicates that a face yaw degree (namely, a left-right rotation angle) β of the face image whose face ID is 0 is 0.44898167°. It can be learned from β=0.44898167° and 0.44898167°>0° that, a face orientation of the user rotates 0.44898167° to the right relative to a connecting line between the camera and a head of the user. It is assumed that k=2, namely, the second preset angle range is [-2°, 2°]. Because β=0.44898167° and 0.44898167°∈[-2°, 2°], the mobile phone may determine that the face yaw degree falls within the second preset angle range.

It can be understood that, if the face yaw degree falls within the second preset angle range, it indicates that a rotation angle of the face orientation of the user relative to the connecting line between the camera and the head of the user is relatively small. In this case, it is more likely that the user focuses on (views or stares at) the touchscreen of the mobile phone, and it is more likely that the user uses the mobile phone in the foregoing scenario (1) and scenario (2). In this case, the mobile phone may start the preset anti-mistouch algorithm, and use the preset anti-mistouch algorithm to implement anti-mistouch on the side edge of the curved screen. Specifically, as shown in FIG. 5, after S508, if the face yaw degree falls within the second preset angle range, the mobile phone performs the (2) anti-mistouch processing procedure (namely, S509). After S508, if the face yaw degree falls beyond the second preset angle range, the mobile phone performs S501.

S509. The mobile phone performs anti-mistouch processing on a preset mistouch operation of the user on the touchscreen.

When the user performs the preset mistouch operation, a contact surface that is between the touchscreen and a hand of the user and that is collected by the mobile phone is a first contact surface in a first-side radian region (a right-side radian region 20 shown in FIG. 1(a)) of the touchscreen, and x second contact surfaces in a second-side radian region (a left-side radian region 10 shown in FIG. 1(a)) of the touchscreen, where 1≤x≤4, and x is a positive integer.

In this embodiment of this application, the first contact surface is a contact surface that is between the touchscreen and a purlicue of the hand of the user and that is collected by the mobile phone when the mobile phone is held by the user. A shape of the first contact surface is similar to a shape of a contact region between the purlicue of the hand of the user and the touchscreen when the user holds the mobile phone. For example, the first contact surface may be the contact surface 1 shown in FIG. 2(b). The second contact surface is a contact surface that is between the touchscreen and a finger of the user and that is collected by the mobile phone when the mobile phone is held by the user. A shape of the second contact surface is similar to a shape of a contact region between the finger of the user and the touchscreen when the user holds the mobile phone. For example, the second contact surface may be the contact surface 2 shown in FIG. 2(b).

For example, before S509, the mobile phone may receive a touch operation of the user on the touchscreen. S509 may specifically include: The mobile phone identifies that the first touch operation of the user on the touchscreen is the preset mistouch operation by using a preset anti-mistouch algorithm; and the mobile phone skips responding to the first touch operation.

It can be understood that, the mobile phone may collect touch operations of the user on the touchscreen in real time, and the touch operations may include the preset mistouch operation and a normal operation of the user on the touchscreen (for example, a tap operation of the user on an icon displayed on the touchscreen). In this way, the mobile phone can identify that the first touch operation in the collected touch operations is the preset mistouch operation, and then perform anti-mistouch processing on the first touch operation, namely, skip responding to the first touch operation.

For example, the mobile phone can identify the preset mistouch operation by identifying a position and a shape of a contact surface between a touch operation of the user on the touchscreen and the touchscreen. The mobile phone may identify a touch operation (namely, the first touch operation) whose contact surface is the first contact surface in the first-side radian region (the right-side radian region 20 shown in FIG. 1(a)) of the touchscreen and the x second contact surfaces in the second-side radian region (the left-side radian region 10 shown in FIG. 1(*a*)) of the touchscreen as the preset mistouch operation.

It should be noted that, in the foregoing embodiment, an example in which the first-side radian region is a right-side radian region of the touchscreen and the second-side radian region is a left-side radian region of the touchscreen is used to describe the method in this embodiment of this application. Certainly, the first-side radian region may alternatively be the left-side radian region of the touchscreen, and the second-side radian region may be the right-side radian region of the touchscreen. This is not limited in this embodiment of this application.

In this embodiment of this application, the HAL layer of the mobile phone identifies the preset mistouch operation, and performs anti-mistouch processing on the preset mistouch operation. Specifically, after collecting a touch operation of the user on the touchscreen, the TP of the mobile phone reports touch information of the touch operation to the HAL layer. The touch information of the touch operation may include touch information corresponding to the preset mistouch operation and/or touch information corresponding to a normal operation of the user on the touchscreen. For example, the touch information may include a position, a shape, and a size of a contact surface corresponding to the touch operation.

Figure 9:
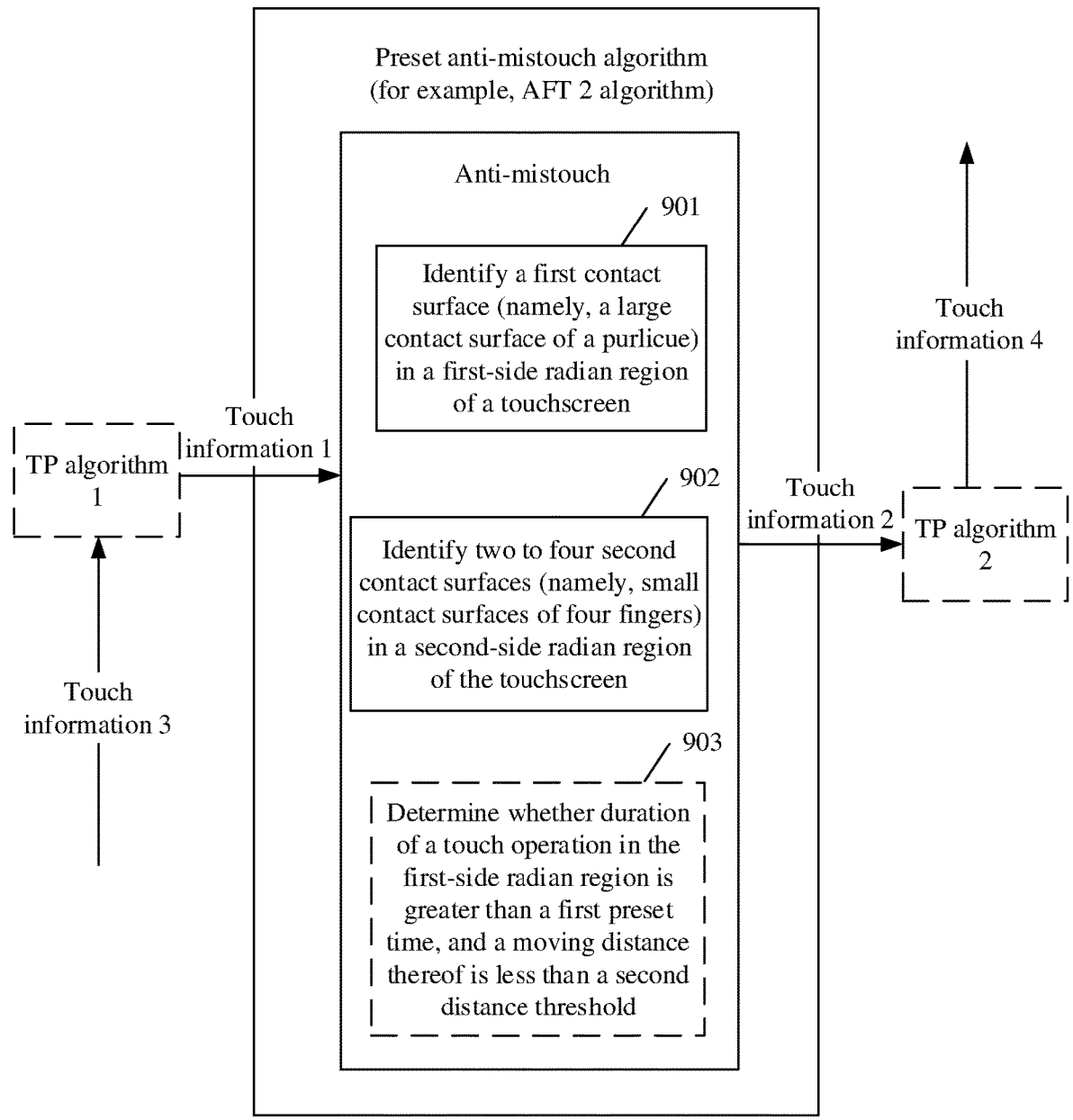
FIG. 9 is a schematic diagram of a logical algorithm architecture of a preset anti-mistouch algorithm according to an embodiment of this application.

The HAL layer may be configured with a plurality of TP algorithms, for example, a TP algorithm 1, a preset anti-mistouch algorithm (for example, an AFT 2 algorithm), and a TP algorithm 2 shown in FIG. 9. Each TP algorithm may process touch information reported by a bottom layer. The preset anti-mistouch algorithm (for example, the AFT 2 algorithm) is used to identify that the first touch operation is the preset mistouch operation. The preset anti-mistouch algorithm may identify the preset mistouch operation by performing 901 and 902 shown in FIG. 9. In this way, when reporting the touch information of the touch operation to an upper layer (for example, the framework layer), the HAL layer may report only touch information corresponding to a normal operation of the user on the touchscreen, but skip reporting touch information corresponding to the preset mistouch operation. In this way, the framework layer does not receive the preset mistouch operation of the user on the touchscreen, and can implement anti-mistouch processing on the preset mistouch operation without responding to the preset mistouch operation.

For example, as shown in FIG. 9, the HAL layer may receive touch information 3 reported by a bottom layer (for example, the kernel layer). The TP algorithm 1 may process the touch information 3 to obtain touch information 1. Then, the preset anti-mistouch algorithm performs anti-mistouch processing on the touch information 1. The preset anti-mistouch algorithm may identify a first contact surface (namely, a large contact surface of the purlicue) in the first-side radian region of the touchscreen and identify a second contact surface (namely, a small contact surface of four fingers) in the first-side radian region of the touchscreen, to identify the preset mistouch operation. In this way, when the preset anti-mistouch algorithm sends touch information to a next-layer TP algorithm or the upper layer (for example, the framework layer), touch information corresponding to the preset mistouch operation may be ignored (or intercepted). For example, as shown in FIG. 9, touch information 2 sent by the preset anti-mistouch algorithm to the TP algorithm 2 does not include the touch information corresponding to the preset mistouch operation, and includes only other touch information in the touch information 1 than the touch information corresponding to the preset mistouch operation. Finally, the TP algorithm 2 may process the touch information 3 sent by the preset anti-mistouch algorithm, to obtain touch information 4, and report the touch information 4 to the upper layer.

This embodiment of this application provides the anti-mistouch method of a curved screen. If the included angle between the touchscreen and the horizontal plane falls within the first preset angle range, the camera may collect a face image. If the distance between the mobile phone and the user is less than the first distance threshold, and the face yaw degree of the user falls within the second preset angle range, it is more likely that the user uses the mobile phone in scenario (1) and scenario (2). In this way, it may be determined that the mobile phone is in the preset anti-mistouch scenario.

In scenario (1) and scenario (2), the user holds the electronic device in a relatively fixed manner, the user holds the electronic device by using a relatively large force, and an area of a contact surface between a finger of the user and the left-side radian region and the right-side radian region of the curved screen is relatively large. When the user holds the electronic device, it is more likely that the side edge of the curved screen is mistouched. By using a conventional anti-mistouch solution, the electronic device cannot perform anti-mistouch processing on a touch operation corresponding to the contact surface. However, in this embodiment of this application, when the mobile phone is in the preset anti-mistouch scenario, the mobile phone can identify the preset mistouch operation, and perform anti-mistouch processing on the preset mistouch operation, to improve accuracy of anti-mistouch.

In addition, if the mobile phone can identify the preset mistouch operation as a mistouch operation, the mobile phone can respond to another non-mistouch operation of the user on the curved screen when the first contact surface and the second contact surface exist, and a problem of a tap failure of the user does not occur, so that user experience in using a curved screen device can be improved.

It can be understood that, duration of the preset mistouch operation generated when the user holds the mobile phone is generally relatively long, but duration of a normal operation of the user on the touchscreen is generally relatively short. To improve accuracy of identifying the preset mistouch operation by the mobile phone, when identifying the preset mistouch operation, the mobile phone not only may use a shape of the contact surface corresponding to the touch operation as reference, but also may determine whether duration of the touch operation is greater than a preset time (for example, a first preset time). Specifically, in this embodiment of this application, the preset mistouch operation is limited as follows. The preset mistouch operation may include a touch operation whose duration of contact with the first-side radian region is greater than a first preset time, whose moving distance in the first-side radian region is less than a second distance threshold, and that is collected by the mobile phone when the mobile phone is held by the user.

In other words, when the mobile phone receives a touch operation of the user on the touchscreen, if the touch operation meets the following two conditions, it may be determined that the touch operation is the preset mistouch operation. Condition (1): A contact surface corresponding to the touch operation received by the mobile phone is the first contact surface in the first-side radian region of the touchscreen and the x second contact surfaces in the second-side radian region of the touchscreen. Condition (2): Duration (namely, duration of the first contact surface) in which the touch operation received by the mobile phone is in contact with the first-side radian region is greater than the first preset time, and a moving distance (namely, a moving distance on the first contact surface) in the first-side radian region is less than a second distance threshold. For example, as shown in FIG. 9, when identifying the preset mistouch operation, the preset anti-mistouch algorithm not only can perform 901 and 902 to determine whether the touch operation meets condition (1), but also can perform 902 to determine whether the touch operation meets condition (2).

For example, the second distance threshold may be 6 millimeters (mm), 5 mm, 2 mm, or 3 mm. The first preset time may be 2 seconds (s), 3 s, or is.

It can be understood that, the duration of the preset mistouch operation generated when the user holds the mobile phone is generally relatively long, but the duration of a normal operation of the user on the touchscreen is generally relatively short. Therefore, when the mobile phone receives a touch operation, if duration of a contact surface corresponding to the touch operation in the first-side radian region is relatively long (for example, greater than the first preset time), and a moving distance in the first-side radian region is relatively small (for example, less than the second distance threshold), it indicates that the touch operation is more likely a mistouch operation generated when the mobile phone is held. Therefore, through the dual determining of condition (1) and condition (2), accuracy of identifying the preset mistouch operation by the mobile phone can be improved.

In some cases, when the mobile phone determines that the first touch operation is the preset mistouch operation, a misjudgment on the first touch operation may exist, and accuracy of anti-mistouch is affected. To improve accuracy of anti-mistouch, the mobile phone may continuously determine whether a movement of a relatively large distance occurs in the identified first touch operation. Specifically, after the mobile phone identifies that the first touch operation is the preset mistouch operation, and before the mobile phone skips responding to the first touch operation, the mobile phone can determine whether a moving distance of the first touch operation within a second preset time is greater than a third distance threshold. The second preset time may be a time period whose duration is first preset duration and that starts when the mobile phone identifies that the first touch operation is the preset mistouch operation. For example, the first preset duration may be 2 s, 3 s, is, or 0.5 s. The third distance threshold may be 7 mm, 5 mm, 3 mm, or 2 mm. The third distance threshold may be the same as or different from the second distance threshold. The first touch operation may include one or more touch operations. For example, the first touch operation may include a touch operation corresponding to the first contact surface and touch operations corresponding to the x second contact surfaces.

In some cases, if the mobile phone can determine that a moving distance of the first touch operation (namely, all touch operations in the first touch operation) within the second preset time is less than or equal to a third distance threshold, it indicates that no misjudgment is made when the mobile phone determines that the first touch operation is the preset mistouch operation. In this way, the mobile phone may skip responding to the first touch operation.

In some other cases, the mobile phone can determine that a moving distance of at least one touch operation in the first touch operation within the second preset time is greater than the third distance threshold. In this case, it indicates that the mobile phone makes a misjudgment on the at least one touch operation. In this case, the mobile phone can perform false killing prevention processing on the at least one touch operation, in other words, the mobile phone can perform an event corresponding to the at least one touch operation in response to the at least one touch operation. The mobile phone does not make a misjudgment on another touch operation in the first touch operation other than the at least one touch operation. In this way, the mobile phone can skip responding to the another touch operation in the first touch operation other than the at least one touch operation.

In this embodiment of this application, after identifying that the first touch operation is the preset mistouch operation, the mobile phone can further determine whether a misjudgment is made on the first touch operation. In this way, accuracy of identifying the preset mistouch operation by the mobile phone can be improved, and accuracy of anti-mistouch processing by the mobile phone can be further improved.

In some embodiments, after a period of time (for example, a third preset time) that starts when the mobile phone identifies that the first touch operation is the preset mistouch operation, the mobile phone may receive a touch operation (for example, a second touch operation) of the user on the touchscreen.

It can be understood that, after the user holds the mobile phone for a period of time, it is more likely that the second touch operation of the user on the touchscreen is a normal touch operation (which is not a mistouch operation generated by the user holding the mobile phone) for which the user triggers the mobile phone to perform a corresponding event. Therefore, if the mobile phone receives the second touch operation of the user in the second-side radian region after the third preset time, the mobile phone can perform an event corresponding to the second touch operation in response to the second touch operation. In other words, the mobile phone can perform false killing prevention processing on the second touch operation. The third preset time is second preset duration that starts when the electronic device detects the preset mistouch operation. For example, the second preset duration may be 2 s, 3 s, is, or 0.5 s. The first preset duration may be the same as or different from the second preset duration.

Figure 10A:
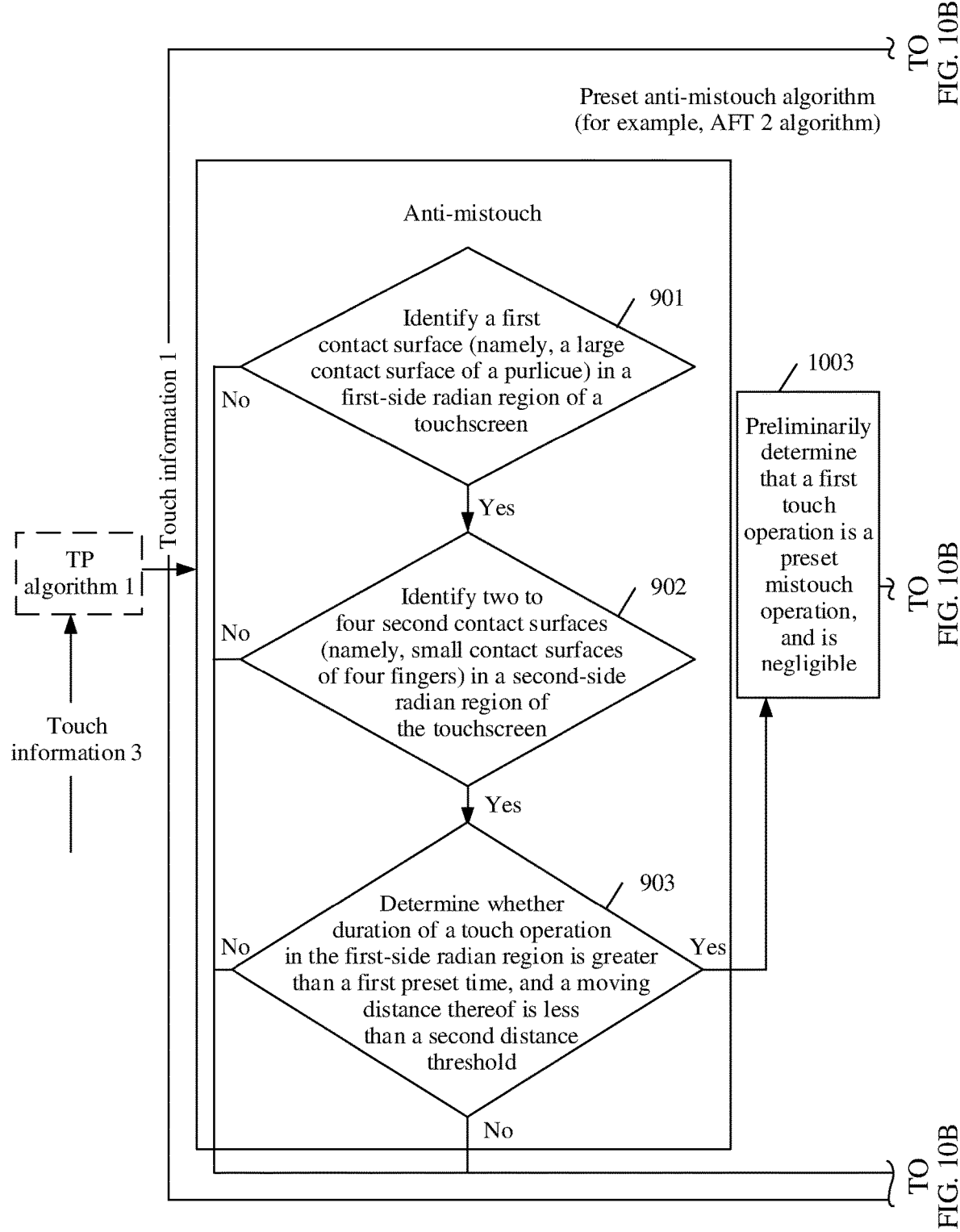
FIG. 10A and FIG. 10B are a schematic diagram of a logical algorithm architecture of a preset anti-mistouch algorithm according to an embodiment of this application.
Figure 10B:
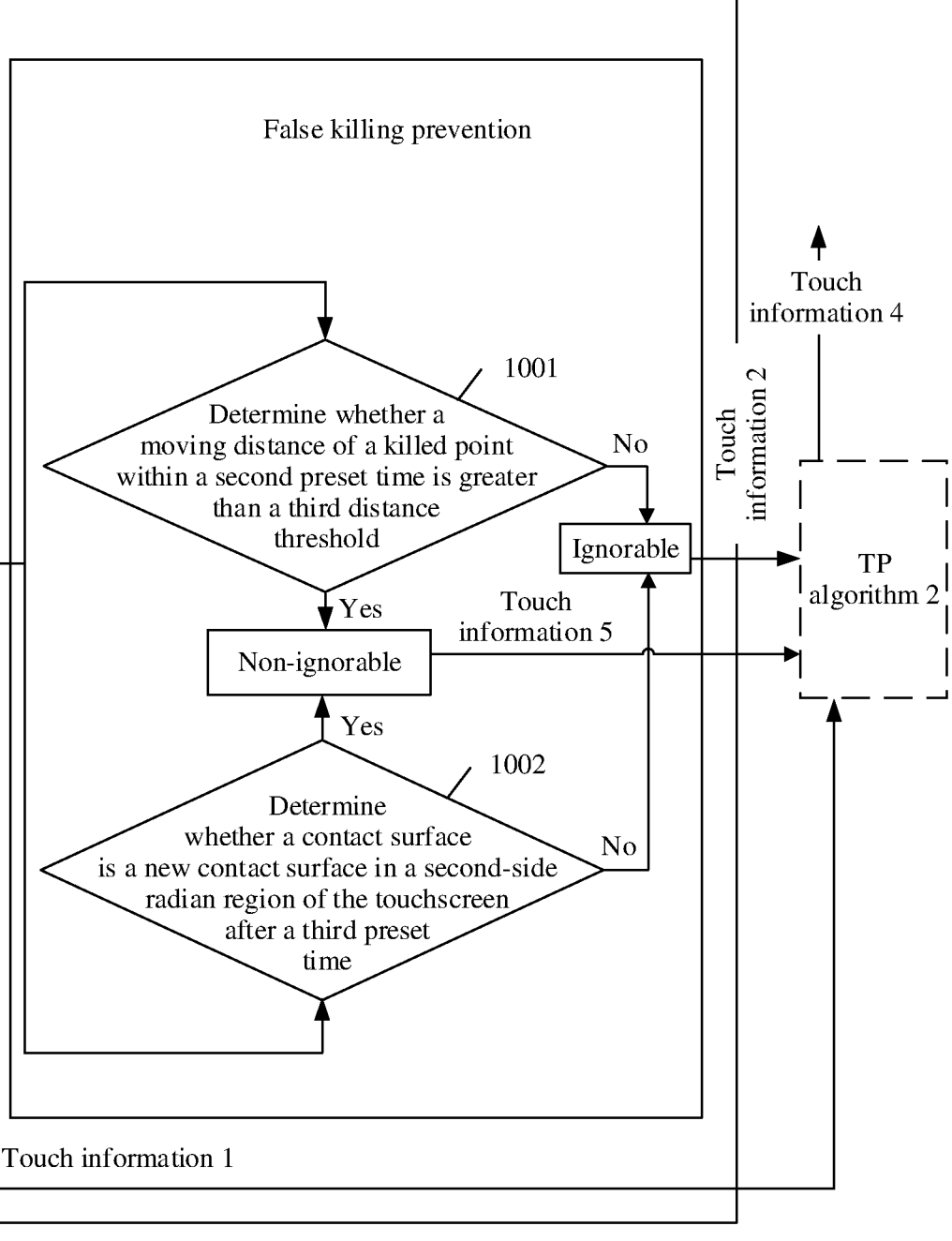

For example, in this embodiment of this application, algorithm logic of the preset anti-mistouch algorithm in this embodiment of this application is described herein with reference to FIG. 10A and FIG. 10B. As shown in FIG. 10A and FIG. 10B, the HAL layer may receive the touch information 3 reported by a bottom layer (for example, the kernel layer). The TP algorithm 1 may process the touch information 3 to obtain the touch information 1. Then, the preset anti-mistouch algorithm performs anti-mistouch processing on the touch information 1.

Specifically, the preset anti-mistouch algorithm may determine whether a contact surface of the first touch operation on the touchscreen includes the first contact surface in the first-side radian region (namely, perform 901). If the contact surface of the first touch operation on the touchscreen does not include the first contact surface in the first-side radian region, the preset anti-mistouch algorithm may directly send the touch information 1 to the TP algorithm 2.

If the contact surface of the first touch operation on the touchscreen includes the first contact surface in the first-side radian region, the preset anti-mistouch algorithm may perform 902 to determine whether the contact surface of the first touch operation on the touchscreen includes the second contact surface in the second-side radian region. If the contact surface of the first touch operation on the touchscreen does not include the second contact surface in the second-side radian region, the preset anti-mistouch algorithm may directly send the touch information 1 to the TP algorithm 2.

If the contact surface of the first touch operation on the touchscreen includes the second contact surface in the second-side radian region, the preset anti-mistouch algorithm may perform 903 to determine whether duration of a touch operation in the first-side radian region in the first touch operation is greater than the first preset time, and whether a moving distance thereof is less than the second distance threshold. If the duration of the touch operation in the first-side radian region is less than or equal to the first preset time, and the moving distance is greater than or equal to the second distance threshold, the preset anti-mistouch algorithm may directly send the touch information 1 to the TP algorithm 2.

If the duration of the touch operation in the first-side radian region is greater than the first preset time, and the moving distance is less than the second distance threshold, the preset anti-mistouch algorithm may preliminarily determine that the first touch operation is the preset mistouch operation, and may ignore the touch information of the first touch operation when sending touch information to the TP algorithm (namely, perform 1003).

To improve accuracy of anti-mistouch and avoid mistakenly determining some touch operations as the preset mistouch operations, as shown in FIG. 10A and FIG. 10B, the preset anti-mistouch algorithm may further perform false killing prevention processing on the first touch operation that is preliminarily determined as the preset mistouch operation.

Specifically, the preset anti-mistouch algorithm may determine whether the moving distance of the first touch operation within the second preset time is greater than the third distance threshold (namely, perform 1001). If moving distances of some touch operations (for example, the at least one touch operation) in the first touch operation within the second preset time are greater than the third distance threshold, it indicates that the at least one touch operation is not a mistouch operation, and a contact surface or a contact point corresponding to the at least one touch operation cannot be ignored. In this case, the preset anti-mistouch algorithm may send touch information 5 including touch information of the at least one touch operation to the TP algorithm 2.

If moving distances of some touch operations (for example, the at least one touch operation) in the first touch operation within the second preset time are less than or equal to the third distance threshold, it indicates that the at least one touch operation is a mistouch operation, and a contact surface corresponding to the at least one touch operation may be ignored. In this case, the preset anti-mistouch algorithm may send touch information 2 that does not include touch information of the at least one touch operation to the TP algorithm 2.

Further, the preset anti-mistouch algorithm may further perform 1002, to ignore a contact surface corresponding to a new touch operation (namely, the second touch operation) that is of the user in the second-side radian region and that is received after the third preset time. In this case, the preset anti-mistouch algorithm may send touch information 2 that does not include touch information of the second touch operation to the TP algorithm 2. The preset anti-mistouch algorithm may further perform 1002 and does not ignore a contact surface corresponding to the new touch operation that is of the user in the second-side radian region and that is received by the mobile phone within the third preset time. In this case, the preset anti-mistouch algorithm may send touch information 5 including touch information of the second touch operation to the TP algorithm 2.

Another embodiment of this application provides an electronic device (for example, the mobile phone). The electronic device includes a processor, a memory, a touchscreen, and a camera. The touchscreen is a curved screen with a radian on a side edge. The memory, the touchscreen, and the camera are coupled to the processor. The memory is configured to store computer program code. The computer program code includes a computer instruction. When the processor executes the computer instruction, the electronic device performs functions or steps performed by the electronic device (for example, the mobile phone) in the foregoing method embodiments.

In some other embodiments, the electronic device further includes one or more sensors. The one or more sensors include at least a gyro sensor. The one or more sensors are configured to collect a direction vector of an orientation of the touchscreen. The direction vector of the orientation of the touchscreen is used to calculate an included angle between the touchscreen and a horizontal plane.

In some other embodiments, the electronic device may further include a structured light camera module. The structured light camera module includes a light projector, a first camera, and a second camera, and a distance between the first camera and the second camera is a first length. For functions of the components in the structured light camera module, refer to related descriptions in the foregoing embodiments. Details are not described herein again in this embodiment of this application.

In some other embodiments, the electronic device may further include a distance sensor. The distance sensor is configured to obtain a distance between the electronic device and a user.

Figure 11:
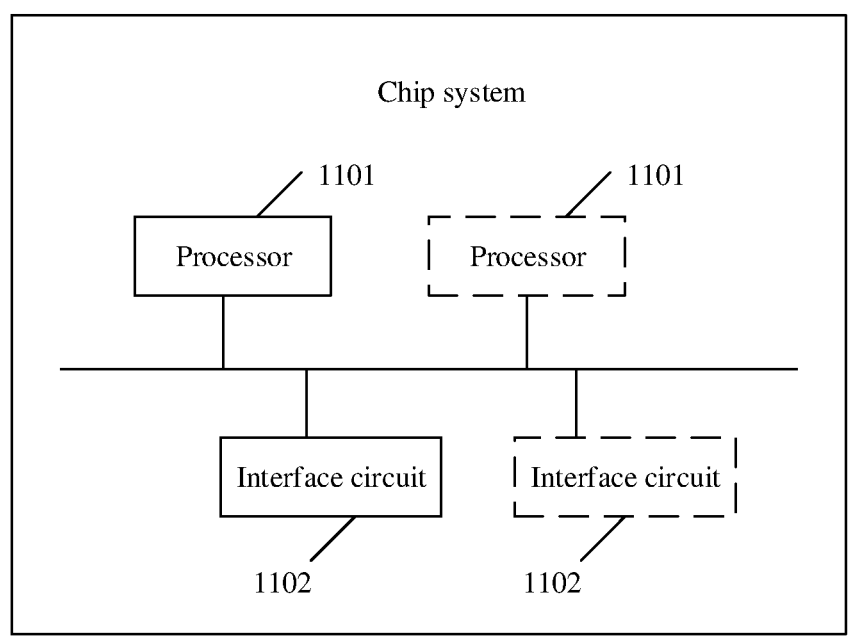
FIG. 11 is a schematic structural diagram of a chip system according to an embodiment of this application.

An embodiment of this application further provides a chip system. As shown in FIG. 11, the chip system includes at least one processor 1101 and at least one interface circuit 1102. The processor 1101 and the interface circuit 1102 may be interconnected by using a line. For example, the interface circuit 1102 may be configured to receive a signal from another apparatus (for example, the memory of the electronic device). For another example, the interface circuit 1102 may be configured to send a signal to another apparatus (for example, the processor 1101 or the touchscreen of the electronic device). For example, the interface circuit 1102 may read instructions stored in the memory, and send the instructions to the processor 1101. When the instructions are executed by the processor 1101, the electronic device may be enabled to perform the steps in the foregoing embodiments. Certainly, the chip system may further include another discrete component. This is not specifically limited in this embodiment of this application.

Another embodiment of this application provides a computer storage medium. The computer storage medium includes a computer instruction. When the computer instruction is run on an electronic device, the electronic device is enabled to perform functions or steps performed by an electronic device (for example, a mobile phone) in the foregoing method embodiments.

Another embodiment of this application provides a computer program product. When the computer program product is run on a computer, the computer is enabled to perform functions or steps performed by an electronic device (for example, a mobile phone) in the foregoing method embodiments.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, namely, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments essentially, or the part contributing to the conventional technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments, but are not intended to limit the protection scope of the embodiments. Any variation or replacement within the technical scope disclosed in the embodiments shall fall within the protection scope of the embodiments. Therefore, the protection scope of the embodiments shall be subject to the protection scope of the claims.

What is claimed is:

1. A method, comprising:
   obtaining, by an electronic device, an included angle between a touchscreen of the electronic device and a horizontal plane, wherein the touchscreen of the electronic device is a curved screen with a radian on a side edge of the curved screen;
   starting, by the electronic device, a camera in response to the included angle between the touchscreen and the horizontal plane falling within a first preset angle range;
   in response to the camera collecting a face image, obtaining, by the electronic device, a distance between the electronic device and a user, and obtaining a face yaw degree of the user, wherein the face yaw degree is a left-right rotation angle of a face orientation of the user relative to a first connecting line, and the first connecting line is between the camera and a head of the user; and
   performing, by the electronic device, anti-mistouch processing on a mistouch operation of the user on the touchscreen in response to the distance between the electronic device and the user being less than a first distance threshold and the face yaw degree falling within a second preset angle range, wherein when the user performs the mistouch operation, a contact surface between a hand of the user and the touchscreen is a first contact surface in a first-side radian region of the touchscreen and x second contact surfaces in a second-side radian region of the touchscreen, wherein $1 \leq x \leq 4$, and x is a positive integer, and wherein the mistouch operation matches a preset mistouch operation.

2. The method according to claim 1, wherein:
   the first contact surface is between the touchscreen and a purlicue of a hand of the user and that is collected by the electronic device when the electronic device is held by the user; and
   the x second contact surfaces are between the touchscreen and a finger of the user and that is collected by the electronic device when the electronic device is held by the user.

3. The method according to claim 1, wherein the mistouch operation comprises a touch operation whose duration of contact with the first-side radian region is greater than a first preset time, whose moving distance in the first-side radian region is less than a second distance threshold, and that is collected by the electronic device when the electronic device is held by the user.

4. The method according to claim 1, wherein performing, by the electronic device, anti-mistouch processing on the mistouch operation of the user on the touchscreen comprises:
   receiving, by the electronic device, a first touch operation of the user on the touchscreen;
   identifying, by the electronic device, that the first touch operation matches the preset mistouch operation using a preset anti-mistouch algorithm; and
   skipping, by the electronic device, responding to the first touch operation.

5. The method according to claim 4, further comprising:
   after identifying, by the electronic device, that the first touch operation of the user on the touchscreen matches the preset mistouch operation using the preset anti-mistouch algorithm, and before skipping, by the electronic device, responding to the first touch operation, determining, by the electronic device, that a moving distance of the first touch operation within a second preset time is less than or equal to a third distance threshold, wherein a duration of the second preset time is a first preset duration and the second preset time starts when the electronic device identifies that the first touch operation matches the preset mistouch operation.

6. The method according to claim 5, wherein the first touch operation comprises one or more touch operations, and the method further comprises:
determining, by the electronic device, that a moving distance of at least one touch operation in the first touch operation within the second preset time is greater than the third distance threshold, and performing, by the electronic device an event corresponding to the at least one touch operation in response to the at least one touch operation; and
skipping, by the electronic device, responding to another touch operation in the first touch operation other than the at least one touch operation.

7. The method according to claim 1, further comprising:
in response to the electronic device receiving a second touch operation of the user in the second-side radian region after a third preset time, performing, by the electronic device, an event corresponding to the second touch operation in response to the second touch operation, wherein a duration of the third preset time is a second preset duration and the third preset time starts when the electronic device identifies that a first touch operation matches the preset mistouch operation.

8. The method according to claim 1, wherein:
the first preset angle range comprises at least one of [−n°, n°] and [90°−m°, 90°+m°];
a value range of n comprises at least any one of (0, 20), (0, 15), or (0, 10);
a value range of m comprises at least any one of (0, 20), (0, 15), or (0, 10);
the second preset angle range is [−k°, k°]; and
a value range of k comprises at least any one of (0, 15), (0, 10), or (0, 5).

9. The method according to claim 1, wherein obtaining, by the electronic device, the included angle between the touchscreen and the horizontal plane comprises:
obtaining, by the electronic device, the included angle between the touchscreen and the horizontal plane using one or more sensors, wherein the one or more sensors comprise at least a gyro sensor.

10. The method according to claim 1, further comprising:
a structured light camera apparatus, the structured light camera apparatus comprises a light projector, a first camera, and a second camera, and a distance between the first camera and the second camera is a first length; and
wherein obtaining, by the electronic device, the distance between the electronic device and the user in response to the camera collecting the face image comprises:
in response to the camera collecting a face image, transmitting, by the electronic device, optical information using the light projector, collecting first image information of a face of the user corresponding to the face image using the first camera, and collecting second image information of the face using the second camera, wherein the first image information and the second image information comprise features of the face of the user;
calculating, by the electronic device, depth information of the face of the user based on the first image information, the second image information, the first length, a lens focal length of the first camera, and a lens focal length of the second camera; and calculating, by the electronic device, the distance between the electronic device and the user based on the depth information of the face of the user.

11. An electronic device, comprising:
a processor;
a non-transitory memory;
a touchscreen, wherein the touchscreen is a curved screen with a radian on a side edge; and
a camera;
wherein the processor is configured to:
obtain an included angle between the touchscreen and a horizontal plane; and
start a camera in response to the included angle between the touchscreen and the horizontal plane falling within a first preset angle range;
wherein the camera is configured to collect an image; and
wherein the processor is further configured to:
obtain a distance between the electronic device and a user and a face yaw degree of the user in response to the camera collecting a face image, wherein the face yaw degree is a left-right rotation angle of a face orientation of the user relative to a first connecting line, and the first connecting line is between the camera and a head of the user; and
perform anti-mistouch processing on a mistouch operation of the user on the touchscreen in response to the distance between the electronic device and the user being less than a first distance threshold and the face yaw degree falling within a second preset angle range, wherein when the user performs the mistouch operation, a contact surface between a hand of the user and the touchscreen is: a first contact surface in a first-side radian region of the touchscreen and x second contact surfaces in a second-side radian region of the touchscreen, wherein 1≤x≤4, and x is a positive integer, and wherein the mistouch operation of the user matches a preset mistouch operation.

12. The electronic device according to claim 11, wherein:
the first contact surface is between the touchscreen and a purlicue of a hand of the user and is collected by the electronic device when the electronic device is held by the user; and
the x second contact surfaces are between the touchscreen and a finger of the user and is collected by the electronic device when the electronic device is held by the user.

13. The electronic device according to claim 11, wherein the mistouch operation comprises a touch operation whose duration of contact with the first-side radian region is greater than a first preset time, whose moving distance in the first-side radian region is less than a second distance threshold, and that is collected by the electronic device when the electronic device is held by the user.

14. The electronic device according to claim 11, wherein the processor being configured to perform anti-mistouch processing on the mistouch operation of the user on the touchscreen comprises the processor being configured to:
receive a first touch operation of the user on the touchscreen;
identify that the first touch operation is the preset mistouch operation using a preset anti-mistouch algorithm; and
skip responding to the first touch operation.

15. The electronic device according to claim 14, wherein the processor is further configured to:
after identifying that the first touch operation is the preset mistouch operation using the preset anti-mistouch algorithm, and before skipping responding to the first touch operation, determine that a moving distance of the first touch operation within a second preset time is less than or equal to a third distance threshold, wherein a duration of the second preset time is a first preset duration and the second preset time starts when the electronic device identifies that the first touch operation matches the preset mistouch operation.

16. The electronic device according to claim 15, wherein the first touch operation comprises one or more touch operations; and
wherein the processor is further configured to:
determine that a moving distance of at least one touch operation in the first touch operation within the second preset time is greater than the third distance threshold;
perform an event corresponding to the at least one touch operation in response to the at least one touch operation; and
skip responding to another touch operation in the first touch operation other than the at least one touch operation.

17. The electronic device according to claim 11, wherein the processor is further configured to:
in response to a second touch operation of the user in the second-side radian region being received after a third preset time, perform an event corresponding to the second touch operation in response to the second touch operation, wherein a duration of the third preset time is a second preset duration and the third preset time starts when the electronic device identifies that a first touch operation matches the preset mistouch operation.

18. The electronic device according to claim 11, wherein:
the first preset angle range comprises at least one of [−n°, n°] and [90°−m°, 90°+m°];
a value range of n comprises at least any one of (0, 20), (0, 15), or (0, 10);
a value range of m comprises at least any one of (0, 20), (0, 15), or (0, 10);
the second preset angle range is [−k°, k°]; and
a value range of k comprises at least any one of (0, 15), (0, 10), or (0, 5).

19. The electronic device according to claim 11, further comprising:
one or more sensors, wherein the one or more sensors comprise at least a gyro sensor; and
wherein the processor being configured to obtain an included angle between the touchscreen and a horizontal plane comprises the processor being configured to:
obtain the included angle between the touchscreen and the horizontal plane using the one or more sensors.

20. A non-transitory computer storage medium, comprising computer instructions, wherein when the computer instructions are run on an electronic device, the electronic device is caused to:
obtaining an included angle between a touchscreen of the electronic device and a horizontal plane, wherein the touchscreen of the electronic device is a curved screen with a radian on a side edge of the curved screen;
start a camera in response to the included angle between the touchscreen and the horizontal plane falling within a first preset angle range;
in response to the camera collecting a face image, obtain a distance between the electronic device and a user, and obtain a face yaw degree of the user, wherein the face yaw degree is a left-right rotation angle of a face orientation of the user relative to a first connecting line, and the first connecting line is between the camera and a head of the user; and
perform anti-mistouch processing on a mistouch operation of the user on the touchscreen in response to the distance between the electronic device and the user being less than a first distance threshold and the face yaw degree falling within a second preset angle range, wherein when the user performs the mistouch operation, a contact surface between a hand of the user and the touchscreen is a first contact surface in a first-side radian region of the touchscreen and x second contact surfaces in a second-side radian region of the touchscreen, wherein 1≤x≤4, and x is a positive integer, and wherein the mistouch operation matches a preset mistouch operation.

* * * * *